United States Patent
Newman et al.

(10) Patent No.: US 11,164,156 B1
(45) Date of Patent: Nov. 2, 2021

(54) EMAIL MESSAGE RECEIVING SYSTEM IN A CLOUD INFRASTRUCTURE

(71) Applicant: Oracle International Corporation, Redwood Shores, CA (US)

(72) Inventors: Christopher John Newman, Pasadena, CA (US); Stanislav Kondratiev, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/245,980

(22) Filed: Apr. 30, 2021

(51) Int. Cl.
*H04L 12/58* (2006.01)
*H04L 29/12* (2006.01)
*H04L 29/06* (2006.01)
*G06Q 10/10* (2012.01)

(52) U.S. Cl.
CPC ......... *G06Q 10/107* (2013.01); *H04L 51/066* (2013.01); *H04L 51/12* (2013.01); *H04L 51/14* (2013.01); *H04L 61/15* (2013.01); *H04L 61/1511* (2013.01); *H04L 61/307* (2013.01); *H04L 63/126* (2013.01)

(58) Field of Classification Search
None
See application file for complete search history.

(56) References Cited

U.S. PATENT DOCUMENTS

| | | | |
|---|---|---|---|
| 6,363,414 B1 * | 3/2002 | Nicholls | G06Q 10/107 709/206 |
| 8,112,482 B1 * | 2/2012 | Geddes | G06Q 10/107 709/206 |
| 8,260,914 B1 * | 9/2012 | Ranjan | H04L 61/1511 709/224 |
| 8,566,938 B1 * | 10/2013 | Prakash | H04L 51/12 726/22 |
| 8,650,245 B1 * | 2/2014 | Ashley | H04L 51/12 709/203 |
| 8,925,087 B1 * | 12/2014 | Oliver | H04L 51/12 726/24 |
| 9,619,825 B1 * | 4/2017 | Albert | H04L 51/28 |
| 10,243,919 B1 * | 3/2019 | Suresh | H04L 67/16 |
| 10,560,423 B1 * | 2/2020 | Rodriguez | H04L 67/02 |

(Continued)

*Primary Examiner* — Backhean Tiv
(74) *Attorney, Agent, or Firm* — Kilpatrick Townsend & Stockton LLP

(57) ABSTRACT

A new and improved onboarding process for configuring and activating an email message receiving system (EMRS) to accept and process email messages on behalf of a customer is disclosed. The process comprises generating a customer-account-specific Domain Name Server (DNS) name that identifies a customer of the EMRS and a mail server for accepting and processing email messages for a domain associated with the customer. The process includes providing the customer-account-specific DNS name to the customer, receiving a request to process email messages for the domain associated with the customer and identifying using the customer-account-specific DNS name, the mail server for receiving the email messages for the domain. The process further includes verifying, using the customer-account-specific DNS name, that the customer has permission for receiving the email messages for the domain. The process includes processing the email messages and delivering the messages to a destination system.

20 Claims, 10 Drawing Sheets

(56) References Cited

U.S. PATENT DOCUMENTS

| | | | |
|---|---|---|---|
| 2004/0030916 A1* | 2/2004 | Karamchedu | G06Q 10/107 726/4 |
| 2004/0249895 A1* | 12/2004 | Way | H04L 63/0236 709/206 |
| 2005/0060643 A1* | 3/2005 | Glass | G06F 40/169 715/205 |
| 2005/0071432 A1* | 3/2005 | Royston, III | H04L 51/12 709/206 |
| 2005/0097177 A1* | 5/2005 | McUmber | H04L 51/12 709/206 |
| 2006/0031357 A1* | 2/2006 | Misra | H04L 51/22 709/206 |
| 2006/0036690 A1* | 2/2006 | O'Neil | H04L 51/12 709/206 |
| 2006/0179113 A1* | 8/2006 | Buckingham | H04L 63/1466 709/206 |
| 2007/0143469 A1* | 6/2007 | Adams | H04L 51/12 709/224 |
| 2007/0204026 A1* | 8/2007 | Berger | H04L 61/35 709/223 |
| 2007/0271343 A1* | 11/2007 | George | G06Q 10/107 709/206 |
| 2008/0082658 A1* | 4/2008 | Hsu | H04L 51/12 709/224 |
| 2008/0120413 A1* | 5/2008 | Mody | G06Q 10/107 709/226 |
| 2008/0133672 A1* | 6/2008 | Gillum | G06Q 10/107 709/206 |
| 2008/0172468 A1* | 7/2008 | Almeida | G06Q 10/107 709/206 |
| 2009/0083413 A1* | 3/2009 | Levow | H04L 63/1416 709/224 |
| 2009/0113003 A1* | 4/2009 | Lu | G06K 9/00456 709/206 |
| 2009/0141985 A1* | 6/2009 | Sheinin | G06K 9/00456 382/202 |
| 2009/0248814 A1* | 10/2009 | Kelly | H04L 51/12 709/206 |
| 2009/0327905 A1* | 12/2009 | Mascarenhas | H04L 67/36 715/738 |
| 2010/0011420 A1* | 1/2010 | Drako | H04L 51/12 726/5 |
| 2010/0100957 A1* | 4/2010 | Graham | H04L 51/12 726/22 |
| 2010/0312621 A1* | 12/2010 | Abdulhayoglu | H04L 63/12 705/14.4 |
| 2011/0179487 A1* | 7/2011 | Lee | H04L 63/1491 726/23 |
| 2012/0215892 A1* | 8/2012 | Wanser | H04L 61/1552 709/222 |
| 2015/0288711 A1* | 10/2015 | Jorgensen | H04L 63/1441 726/23 |
| 2015/0356630 A1* | 12/2015 | Hussain | G06Q 10/107 705/14.69 |
| 2016/0057100 A1* | 2/2016 | Blinn | G06F 16/95 709/219 |
| 2016/0099967 A1* | 4/2016 | Stemm | G06F 21/55 726/1 |
| 2018/0081991 A1* | 3/2018 | Barber | H04L 63/1441 |
| 2018/0351977 A1* | 12/2018 | Carothers | H04L 63/1483 |
| 2019/0379660 A1* | 12/2019 | Thirumavalavan | H04L 51/22 |
| 2020/0067862 A1* | 2/2020 | Giralte | H04L 9/3271 |
| 2020/0382455 A1* | 12/2020 | Fasoli | H04L 51/043 |

* cited by examiner

EMAIL MESSAGE RECEIVING SYSTEM IN A CLOUD INFRASTRUCTURE

BACKGROUND

Cloud-based email services provide a fast and reliable solution for receiving and processing email messages for individuals or organizations as well as being able to quickly and reliably process high volumes of email messages for delivery to a set of recipients. A cloud-based email receiving service is a service that is primarily responsible for handling the receipt of email messages for one or more domains associated with an organization and may perform various mail-receiving and mail-processing functions such as scanning email messages for spam and viruses, rejecting email messages from untrusted sources and accepting emails for recipients in one or more domains owned by an organization. To utilize the services provided by a cloud-based email receiving service, a customer (e.g., a user) of the email receiving service typically has to configure or activate the cloud-based email receiving service for receiving email messages on behalf of a domain owned by the customer via an onboarding process. The onboarding process is typically a complex process that involves the customer having to perform multiple steps to successfully configure and activate the cloud-based email receiving service to receive and process emails. Existing techniques for onboarding to a cloud-based email receiving service need to be improved to efficiently handle the complexities of the onboarding process.

BRIEF SUMMARY

This disclosure relates generally to a cloud-based email receiving service. More specifically, but not by way of limitation, this disclosure describes a new and improved onboarding process for configuring and activating an email message receiving system (EMRS) to accept and process email messages on behalf of a customer. The new and improved onboarding process enables a customer of the EMRS to onboard with the EMRS in fewer steps as compared to a traditional on-boarding process by generating a customer-account-specific DNS name that is unique to each customer of the EMRS. The customer-account-specific DNS name is used to prove that the customer has authorization or permission to receive email messages for a domain owned by the customer and additionally identifies the address of the mail server responsible for receiving and processing email messages on behalf of the domain associated with the customer.

In certain embodiments, an email message receiving system (EMRS) is disclosed. The EMRS generates a customer-account-specific Domain Name Server (DNS) name that identifies a customer of the EMRS and a mail server for accepting and processing email messages for a domain associated with the customer. The system provides the customer-account-specific DNS name to the customer and receives a request to process the email messages for the domain associated with the customer. Responsive to the request, the system identifies, using the customer-account-specific DNS name, the mail server for receiving the email messages for the domain associated with the customer. The system verifies using the customer-account-specific DNS name, that the customer has permission for receiving the email messages for the domain associated with the customer. Responsive to the identifying and verifying, the system processes the email messages for the domain and based on the processing, delivers the email messages to a destination system.

In certain examples, the customer-account-specific DNS name is a customer-account-specific address (A) record that identifies an Internet Protocol (IP) address of the mail server for accepting the email messages for the domain associated with the customer. In certain examples, the customer-account-specific A record comprises a region identifier identifying a location of the mail server for receiving the email messages for the domain associated with the customer. In certain examples, the customer-account-specific A record comprises a customer-specific identifier that uniquely identifies the customer of the email message receiving service. In certain examples, the customer-specific identifier represents a unique random number or a hash-based message authentication code of an email domain cloud resource identifier associated with the customer.

In certain examples, the EMRS publishes the customer-account-specific DNS name to a DNS associated with the EMRS. In certain examples, the EMRS receives a set of one or more email message receipt rules for processing the email messages for the domain. The email receipt rules comprise at least a condition and a set of one or more actions to be performed by the mail server for processing the email messages.

In certain examples, processing the email messages by the EMRS comprises determining, for each email message, a recipient of the email message, determining that the recipient matches a target recipient specified in the condition for an email receipt rule in the set of email receipt rules and based on the determining, executing, a corresponding action specified in the email receipt rule.

In certain examples, the action comprises delivering the email message to an email client application associated with the recipient for delivery to the recipient. In certain examples, the action comprises rejecting the email message by returning a bounce message to the sender of the recipient. In certain examples, the action comprises delivering the email message to an object data store in the EMRS for further processing of the email message. In certain examples, action comprises publishing the email message as a topic to a notification system in the email message receiving system.

Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the Detailed Description, and further description is provided there.

DETAILED DESCRIPTION

Figure 1:
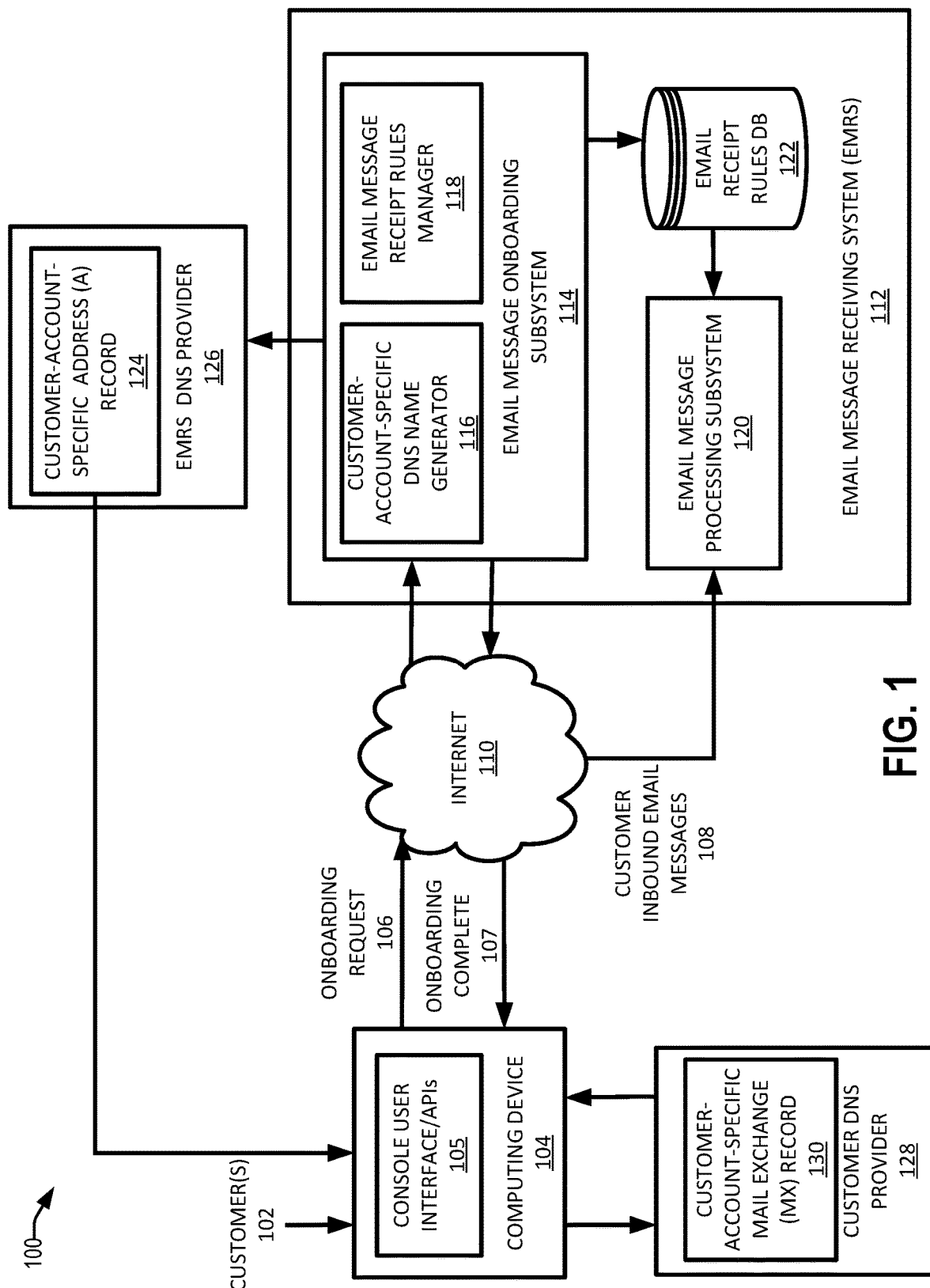
FIG. 1 depicts a computing environment including an email message receiving system (EMRS) 112 that provides a new and improved on-boarding process for activating the receipt of email messages for a domain associated with a customer.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates generally to a cloud-based email receiving service. More specifically, but not by way of limitation, this disclosure describes a new and improved onboarding process for configuring and activating a cloud-based Email Message Receiving Service (EMRS) to accept and process email messages on behalf of a customer. The new and improved onboarding process enables a customer of the EMRS to onboard with the EMRS in fewer steps as compared to a traditional on-boarding process by generating a customer-account-specific DNS name that is unique to each customer of the EMRS. The customer-account-specific DNS name is used to prove that the customer has authorization or permission to receive email messages for a domain owned by the customer and additionally identifies the address of the mail server responsible for receiving and processing email messages on behalf of the domain associated with the customer.

Cloud-based email receiving services are generally used by entities such as organizations, enterprises, or individual subscribers to receive and process email messages for (e.g., on behalf of) one or more email domains owned by the organization. To utilize the services provided by a cloud-based email receiving service, a user (e.g., an administrator) of an organization has to configure and activate the service via an onboarding process. The "onboarding process" traditionally involves multiple steps that includes at least a first step in which a customer has to prove that they have permission to receive email messages for their domain. This step typically involves generating a validation token (a unique string) by the service which is then uploaded by the customer to their Domain Name Server (DNS) portal. The validation token is then published by the customer's DNS. The published validation token enables the cloud-based email receiving service to verify that the customer's cloud email resource (i.e., customer's account) has permission to receive email for its domain. To successfully complete the onboarding process, the customer then has to perform additional steps to set up a DNS Mail Exchange (MX) record for the domain name that identifies a generic mail server that is responsible for accepting email messages for the organization. The receipt of email messages by the email message receiving service is then activated when the customer uploads the MX record configuration to their DNS portal which is published by the customer's DNS.

The email message receiving system (EMRS) described in the present disclosure provides several technical advancements and/or improvements over existing cloud-based email receiving services by providing a new and improved onboarding process that enables customers to onboard with the EMRS in fewer steps compared to the multiple steps involved in the traditional on-boarding process described above. The new and improved onboarding process involves, generating by the EMRS, a customer-account-specific DNS name for a customer that uniquely identifies a customer (e.g., a cloud service account associated with the customer) of the EMRS and identifies a mail server in the EMRS that is responsible for accepting and processing email messages for a domain associated with the customer. The unique customer-account-specific DNS name is used to prove that the customer has authorization or permission to receive email messages for a domain owned by the customer and additionally identifies the address of the mail server responsible for receiving and processing email messages on behalf of the domain associated with the customer.

By using the customer-account-specific DNS name, a customer is able to onboard (i.e., activate the receipt and processing of email messages for a domain owned by the customer/organization) with the EMRS in fewer steps compared to the multiple steps involved in a traditional on-boarding process. In the new and improved onboarding process, a customer does not have to separately provision a unique string to prove its identity and permission for receiving email for a domain associated with the customer. Since the customer-account-specific DNS name can be used by EMRS to both identify a mail server responsible for accepting email messages for the domain associated with the customer as well as to prove that the customer has authorization or permission to receive email messages, a customer can activate the receipt and processing of email messages by the EMRS in a "single step" by uploading the customer-account-specific DNS name to their DNS portal. Thus, the use of the customer-account-specific DNS name provides a faster and more efficient process for a customer to activate (on-board with) the EMRS to receive email messages for its domain(s).

Referring now to the drawings, FIG. 1 depicts a computing environment including an email message receiving system (EMRS) 112 that provides a new and improved on-boarding process for activating the receipt of email messages for a domain associated with a customer, according to certain embodiments. The EMRS 112 may be implemented by one or more computing systems that execute computer-readable instructions (e.g., code, program) to implement the EMRS 112. As depicted in FIG. 1, the EMRS 112 includes various subsystems including an email message onboarding subsystem 114, a customer-account-specific DNS name generator subsystem 116, an email message receipt rules subsystem 118 and an email message processing subsystem 120. Portions of data or information used by or generated by the subsystems shown in FIG. 1 may be stored in a persistent memory data store such as an email receipt rules database 122. The subsystems depicted in FIG. 1 may be implemented using software (e.g., code, instructions, program) executed by one or more processing units (e.g., processors, cores) of a computing system, hardware, or combinations thereof. The software may be stored on a non-transitory storage medium (e.g., on a memory device).

The EMRS 112 may be implemented in various different configurations. In certain embodiments, the EMRS 112 may be implemented on one or more servers of a cloud provider network and its email message receiving and processing services may be provided to subscribers of cloud services on a subscription basis. Computing environment 100 depicted in FIG. 1 is merely an example and is not intended to unduly limit the scope of claimed embodiments. One of ordinary skill in the art would recognize many possible variations, alternatives, and modifications. For example, in some implementations, the EMRS 112 can be implemented using more or fewer subsystems than those shown in FIG. 1, may combine two or more subsystems, or may have a different configuration or arrangement of subsystems.

In certain embodiments, the EMRS 112 provides a new and improved onboarding process to enable customers of the EMRS 112 to configure the EMRS 122 for receiving and processing email messages on behalf of one or more domains owned by the customer. A customer (e.g., 102) may represent an entity such as an organization, an enterprise, or an individual subscriber of the EMRS 112 who subscribes to the services provided by the EMRS 112 for receiving and processing inbound email messages for recipients of one or more domains owned by the customer. An "inbound email message" may refer to an email message that is sent by an external user (i.e., a user external to the organization) to an internal user (i.e., recipient) of the organization. A "domain" (also referred to herein as an "email domain" or a "domain name") may refer to the Internet designation for an email host associated with an organization, and may be identified by the web address that comes after the @symbol in an email address. By way of example, for an email address such as user1@abccompany.com, "abccompany.com" may refer to the email domain associated with the organization ("abccompany").

In certain examples, a user may interact with the EMRS 112 using a computing device 104 that is communicatively coupled to the EMRS 112 possibly via a public network 110 (e.g., the Internet). The user may be an end-user (e.g., an administrator), a business owner, or a marketing officer associated with the customer 102 who interacts with the EMRS 112 to utilize the email receiving and processing services provided by the EMRS 112 to receive and process email messages for (i.e., on behalf of) an email domain associated with the customer. The computing device may be of various types, including but not limited to, a mobile phone, a tablet, a desktop computer, and the like. A user may interact with the EMRS 112 using a console user interface (UI) (which may be a graphical user interface (GUI)) of an application executed by the computing device or via Application Programming Interface (API) operations 105 provided by the EMRS 112.

In certain embodiments, a user may interact with the EMRS 112 (e.g., via the console UI/APIs 105) to initiate an onboarding process to configure the EMRS 112 to receive email messages for (i.e., on behalf of) an email domain associated with the customer. As part of the on-boarding process, the user may send an onboarding request 106 to the EMRS 112 which may, in certain embodiments, be received by an email message onboarding subsystem 114 within the EMRS 112. The email message onboarding subsystem 114 then processes the onboarding request 106 to generate a customer-account-specific DNS name for the customer. The customer-account-specific DNS name identifies a customer (e.g., a cloud service account associated with the customer) of the EMRS 112 and identifies a mail server responsible for accepting and processing email messages for a domain associated with the customer. The customer account-specific DNS name generated for a customer is used to prove that the customer (i.e., a specific cloud service account associated with the customer) has authorization or permission to receive email messages for the domain(s) owned by the customer and additionally identifies the address of the mail server responsible for receiving and processing email messages on behalf of a domain associated with the customer. The customer-account-specific A record thus both activates the receipt and routing of email messages for a domain associated with the customer also proves that the customer's account (cloud resource) has permission to receive that email.

In certain embodiments, the customer-account-specific DNS name may be represented as a customer-account-specific address (A) record that is published to the DNS provider of the EMRS 112 and identifies the IP address of the mail server responsible for receiving and processing email messages for a domain associated with the customer. As will be described in greater detail below, the customer-account-specific address (A) record enables a customer of the EMRS 112 to onboard with the EMRS 112 in fewer steps compared to the number of steps required by a traditional on-boarding process which typically involves a customer having to separately provision a unique string to prove that it has permission for receiving mail for a domain associated with the customer. In the embodiment depicted in FIG. 1, the customer-account-specific DNS name generator subsystem 116 within the email message onboarding subsystem 114 may be configured to generate the customer-account-specific DNS name for a customer. Details related to the processing performed by the customer-account-specific DNS name generator subsystem 116 for generating a customer-account-specific DNS name for a customer is described below in detail in FIG. 2 and its accompanying description.

The email message onboarding subsystem 114 additionally includes an email message receipt rules subsystem 118. The email message receipt rules subsystem 118 may be configured to manage the email receipt rules for email messages that the EMRS 112 receives for a domain owned by a customer. The email receipt rules may be created, for instance, by the user, via the console UI, or via API operations 105 provided by the EMRS 112. By way of example, using email receipt rules, a user may specify how the EMRS 112 should handle or process the email messages that it receives for recipients of an email domain owned by the customer. For example, a user (e.g., an administrator) of an organization that owns a domain, "abccompany.com," may create an email receipt rule that specifies that email messages for user1@abccompany.com should not be delivered, but that all other email for abccompany.com and its subdomains should be delivered.

In certain examples, an email receipt rule may comprise a condition and an ordered list of actions. The rule's action is triggered when an email message is received that meets the rule's condition. For instance, a rule's action may be triggered if the recipient of an incoming email message matches a recipient specified in the conditions for the receipt. Email receipt rules may also specify that messages from specific IP address ranges can be blocked or allowed. In certain examples, email receipt rules may specify that bounce messages can automatically be sent when messages are sent to specific email addresses. A user may also perform additional operations such as edit and delete operations on email receipt rules via the console UI or via the API operations. In a certain implementation, the email message rules subsystem 118 may be configured to receive and process the email receipt rules generated by the various customers of the EMRS 112 and store the email receipt rules in an email receipt rules database 122.

In certain embodiments, the EMRS 112 may additionally include an email message processing subsystem 120. The email message processing subsystem 120 may be configured to receive and process incoming email messages 108 for a domain associated with a customer. For instance, the email messages may be received by the email message processing subsystem 120 via a public network (e.g., Internet 110). The processing of email messages may involve, using the customer-account-specific DNS name generated for the customer to prove that the customer's account has permission to receive the email and to activate the receipt of email messages for the domain associated with a customer. The processing may additionally involve, determining, by the email message processing subsystem 120, if a recipient of an incoming email message for a domain associated with a customer matches a recipient specified in the conditions of an email receipt rule specified by the customer. The email message processing subsystem 120 may then execute the actions specified in that receipt rule to determine whether to reject or accept an inbound email message for the recipient. In certain embodiments, the processing performed by the email message processing subsystem 120 may additionally involve, for instance, communicating with other mail servers in the cloud provider network, scanning email messages for spam and viruses, rejecting email messages from untrusted sources, accepting email messages for recipients in the customer's domain and delivering those email messages to the recipients. Additional details of the processing performed by various subsystems of the email message processing subsystem 120 is described in FIG. 3.

Figure 2:
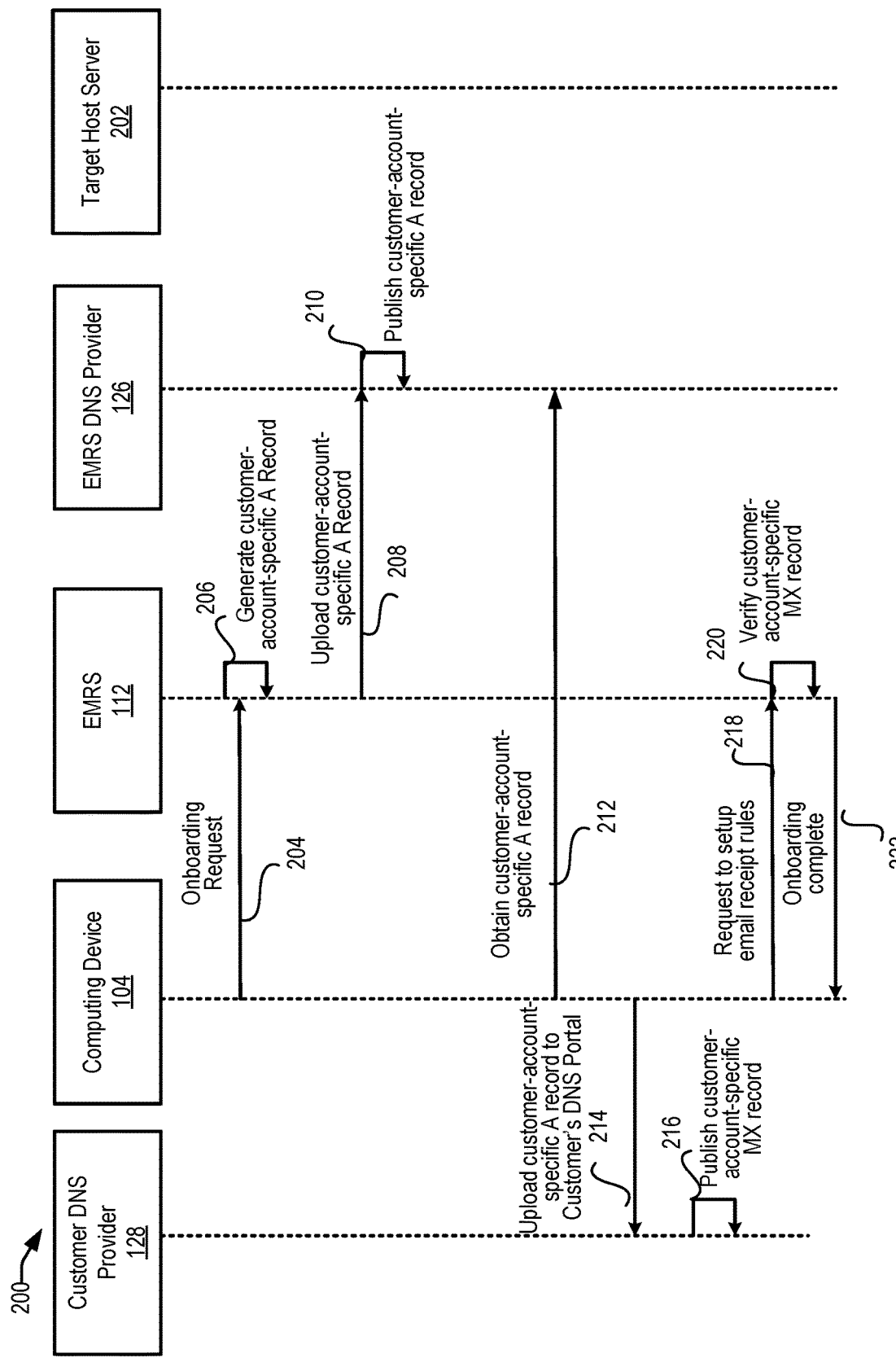
FIG. 2 is a sequence diagram illustrating a new and improved on-boarding process for activating the receipt of email messages for a domain associated with a customer, according to certain embodiments.

FIG. 2 is a sequence diagram illustrating a new and improved on-boarding process for activating the receipt of email messages for a domain associated with a customer, according to certain embodiments. The processing depicted in FIG. 2 depicts the interactions of the EMRS 112 with one or more additional subsystems shown in the computing environment 100 of FIG. 1. The process is initiated at operation 204 when a user (e.g., an administrator associated with a customer 102) sends an onboarding request to the EMRS 112 to configure the EMRS 112 to receive email messages for (i.e., on behalf of) a specific domain associated with the customer. For instance, the user may send an onboarding request (via the console UI or via API operations) using a computing device 104. In certain embodiments, and as previously described, an email onboarding subsystem 114 within the EMRS 112 may process the onboarding request. For instance, the processing of the onboarding request may involve, generating, by the customer-account-specific DNS name generator subsystem 116, at operation 206, a customer-account-specific DNS name that uniquely identifies a cloud service account associated with the customer and a mail server responsible for receiving and processing email messages for a domain associated with the customer In a certain implementation, the customer-account-specific DNS name is a customer account-specific address (A) record published in the DNS provider 126 of the EMRS 112 that identifies (i.e., points to the IP address of) a mail server in the EMRS 112 that is configured to receive and process incoming email messages for the customer's domain. By way of example, a customer-account-specific A record may be represented as shown below:

<customer-specific identifier>.inbound.email.<region id>.abccompanycloud.com In the above representation, the customer-account-specific A record specifies a host name/mail server (inbound.e-mail) that is responsible for handling the emails for the customer's domain and points to an IP address of the mail server. The customer-account-specific A record additionally specifies a region identifier <region id> that identifies a region or location in which the mail server is located. For example, if the mail server is located in the US West Coast region, the region identifier for the mail server may be identified as "us-west-coast." Encoding an identifier for a cloud region in the customer-account-specific A record avoids the need to coordinate the uniqueness of the customer-account-specific A record across different regions in which the mail servers are located. The customer-account-specific A record also specifies a <customer-specific identifier> that uniquely identifies a customer (i.e., a cloud service account associated with the customer) of the EMRS 112. Various approaches may be used by the customer-account-specific DNS name generator subsystem 116 to generate a customer-specific identifier. For instance, in one approach, the customer-specific identifier may be a unique random number generated by a random number generator tool in the customer-account-specific DNS name generator 116. In other approaches, the unique identifier may be a hash of the customer's email domain cloud resource identifier (e.g., abccompanycloud.com) or a cryptographic hash or a hash-based message authentication code (HMAC) of the customer's email domain cloud resource identifier combined with a regional identifier.

At operation 208, the customer-account-specific DNS name generator 116 uploads the customer-account-specific A record as a resource record to a DNS provider 126 associated with the EMRS 112. In certain examples, the EMRS DNS provider 126 may be a high-performance, resilient, global DNS service that publishes domain names associated with various customers of the EMRS 112 to a global DNS directory. In certain examples, the DNS provider 126 may be implemented as a hierarchical distributed database comprising a directory of domain names that translate A records to numeric IP addresses.

At operation 210, the EMRS DNS provider 126 publishes the customer-account-specific A record to its global DNS directory. The customer-account-specific A record points to an Internet Protocol (IP) address of the mail server (i.e., cloud mail server) identified in the customer-account specific A record that is configured to receive and process email messages on behalf of the customer's email domain.

In certain examples, at operation 212, a user (e.g., an administrator) of a customer of the EMRS 112 obtains the customer-account-specific A record published in the global directory of the EMRS DNS provider 126 and at operation 214, the user uploads the customer-account-specific A record to a DNS portal of the customer's DNS provider 128. At operation 216, the customer's DNS provider 128 places the customer-account-specific A record inside a Mail Exchanger (MX) field of an MX record in the DNS provider 128 associated with the customer. An MX record may represent a type of resource record in the DNS that specifies one or more mail server(s) responsible for accepting email messages on behalf of a domain name associated with a customer. As a result of the operation performed at 216, the customer-account-specific MX record is published in the customer's DNS provider 128. The published customer-account-specific MX record is used by the EMRS 112 to both prove that a specific account associated with the customer has authorization or permission to receive and process email messages for (or on behalf of) a domain associated with the customer and identifies a mail server in the cloud (i.e., in the EMRS 112) that is configured to receive and process email messages on behalf of the customer's email domain.

In the embodiment depicted in FIG. 2, the customer's DNS provider 128 is different from the EMRS DNS provider 126. In alternate embodiments, the customer's DNS provider 128 may be the same as the EMRS DNS provider 126. In this case, the EMRS DNS provider 126 may be configured to publish both the customer-account-specific A record as well as the customer-account-specific MX record. This enables a customer to onboard with the EMRS in fewer steps than described above by reducing the extra step required by the customer to publish the customer-account-specific A record as an MX record in the customer's DNS provider 128.

At operation 218, a user associated with the customer may create email receipt rules and transmit a request to the EMRS 112 to setup the email receipt rules. As previously described, the email receipt rules may be created via a console UI or via API operations 105 provided by the EMRS 112 and specify how the EMRS 112 should handle or process the email messages that it receives for an email domain owned by the customer.

At operation 220, the EMRS 112 verifies the customer-account-specific MX record and upon verification, finishes setting up the email receipt rules created by the customer. For instance, the verification at operation 220 may involve using the published customer-account-specific MX record to prove that the customer's account identified in the customer-account-specific MX record has explicit permission to process email directed to the customer's domain as well as activate the receipt and processing of email messages for the domain name associated with the customer. By using the customer-account-specific MX record, a customer of the EMRS 112 can onboard with the EMRS 112 in fewer steps than the number of steps required by a traditional on-boarding process which typically involves a customer having to separately provision a unique string to prove that it has permission for receiving mail for a domain associated with the customer as a separate step in the on-boarding process.

At operation 222, the EMRS 112 sends an "onboarding complete" message to the customer's computing device 104 to indicate the successful completion of the onboarding process. At this point, the user has configured the EMRS 112 to receive and process email messages for (on behalf of) a domain associated with the customer. In certain examples, as part of operation 222, a user may optionally transmit a test email message to the EMRS 112 to test the EMRS's capability to receive email messages for its domain prior to actually using the EMRS for receiving and processing email messages for the domain.

Figure 3:
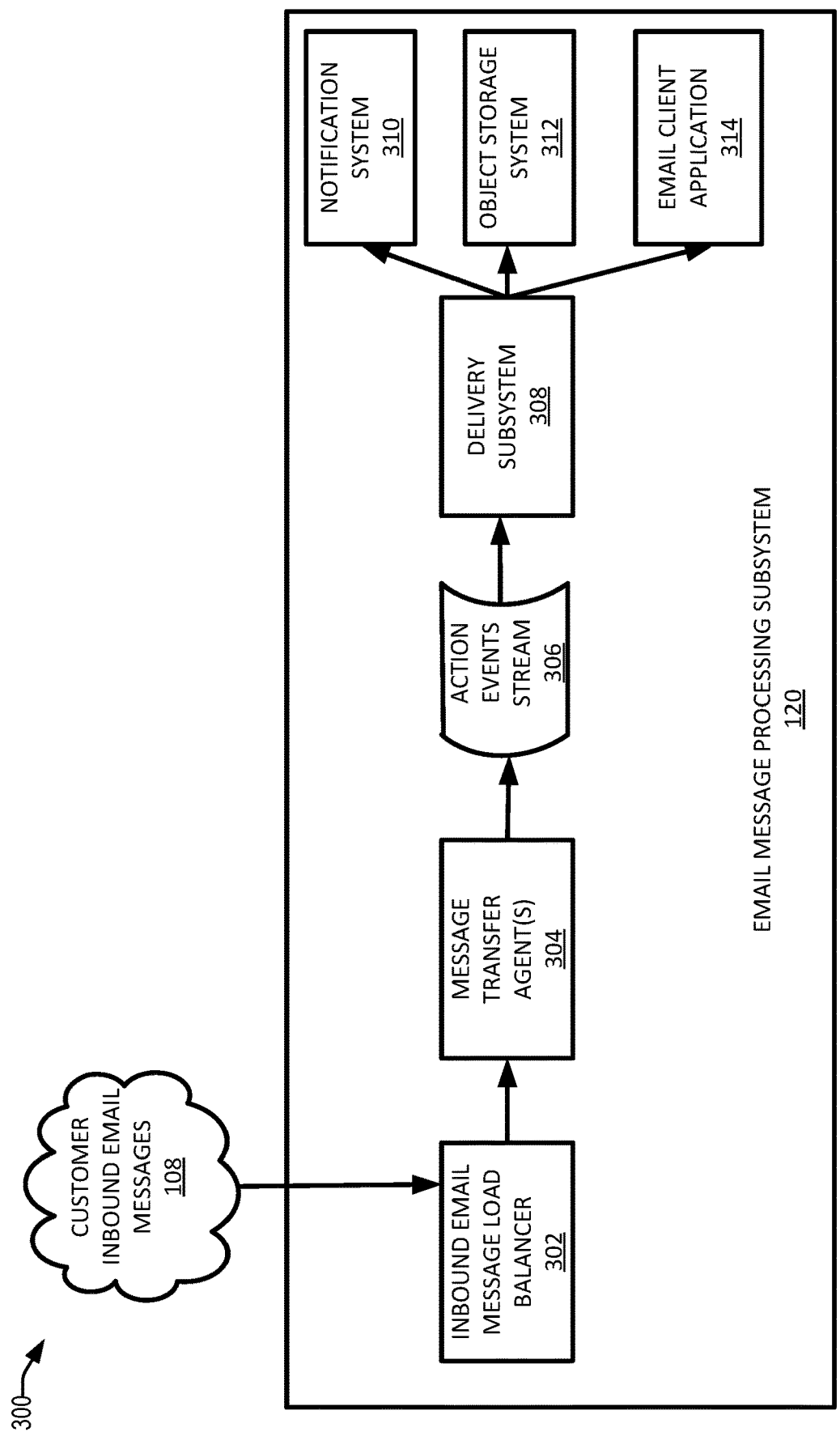
FIG. 3 is a high level diagram of one or more subsystems comprising the email message processing subsystem shown in FIG. 1 for processing email messages for recipients of a domain associated with a customer, according to certain embodiments.

FIG. 3 is a high level diagram of one or more subsystems comprising the email message processing subsystem shown in FIG. 1 for processing email messages for recipients of a domain associated with a customer, according to certain embodiments. The email message processing subsystem 118 may be implemented using one or more subsystems that execute computer-readable instructions (e.g., code, program) to implement the email message processing subsystem 118. As depicted in FIG. 3, the email message processing subsystem 118 may include an inbound email message load balancer 302, a set of one or more message transfer agents (MTAs) 304, an action events stream 306, a delivery subsystem 308 and one or more destination subsystems 310. The subsystems 302, 304, 306, 308 and 310 depicted in FIG. 3 may be implemented using software (e.g., code, instructions, program) executed by one or more processing units (e.g., processors, cores) of a computing system, hardware, or combinations thereof. The software may be stored on a non-transitory storage medium (e.g., on a memory device).

As shown in the embodiment depicted in FIG. 3, an inbound email message load balancer 302 may be configured to receive email messages for a domain associated with a customer, identify the mail server responsible for accepting email messages for the domain and route the email messages to the identified mail server. In certain embodiments, the inbound email message load balancer 302 may be configured to use the customer-account-specific MX record generated for the customer to identify the mail server responsible for accepting email messages for the domain. As previously described, the published customer-account-specific MX record is used by the EMRS 112 to both prove that a specific account associated with the customer has authorization or permission to receive and process email messages for (or on behalf of) the domain associated with the customer and identify a mail server that is configured to receive and process email messages on behalf of the customer's email domain.

In certain examples, the identified mail server may be a message transfer agent (MTA) 304 within the EMRS 112 that is configured to receive and process email messages on behalf of a domain associated with the customer. A MTA may refer to a network element within the EMIRS 112 that is responsible for transferring email messages received from a first system to another system (e.g., another MTA or a destination system) in the EMRS 112 using a communication protocol such as Simple Message Transfer Protocol (SMTP). In certain embodiments, the processing performed by the MTA may include, determining whether to reject or accept an inbound email message for a recipient by accessing the email receipt rules for the customer stored in the email receipt rules database 122. For instance, the identified MTA (e.g., 304) may determine if a recipient of an incoming email message for the domain matches a recipient specified in the conditions of an email receipt rule specified by the customer. The 304 may then execute the actions specified in that receipt rule to determine whether to reject or accept an inbound email message for the recipient. In certain examples, the actions executed by the MTA may involve, delivering the email message to an object store for further processing, publishing the email message as a topic to a notification system, rejecting the email message by returning a bounce response to the sender or transmitting the email message to an email client application (e.g., outlook) for delivery to the recipient of the email message. The MTA 304 may additionally include capabilities for performing essential gating functions such as metering, communicating with other mail servers in the EMRS, scanning the email messages for spam and ruses, rejecting the email messages from untrusted sources, accepting email messages for recipients in the customer's domain and delivering those email messages to the recipients.

In certain examples, the MTA (e.g., 304) may be configured to submit action events corresponding to the actions executed by the MTA to an action events stream 306. The action events stream 306 may represent a streaming service within the EMRS 112 for ingesting and persisting queued action events in real-time. The action events stream 306 may act as a decoupling layer between incoming messages received by the MTA 304 and outgoing action events transmitted to action service hosts on the delivery subsystem 308. The action events stream 306 may act as a path for the MTA to dispatch action events to the delivery subsystem 308. In certain examples, the action events stream 306 may provide for reliable and replicated persistence of action events that may be consumed on demand by the delivery subsystem 308. In certain examples, the action events stream 306 may include capabilities to provide a scale out mechanism via stream partitioning to keep up with the potentially growing rate of inbound email action events received over time and may perform the parallelized processing of action events via the mechanism of stream partitioning. Stream partitions may enable the action events stream service 306 to distribute the action events across multiple nodes. Each partition can be placed on a separate machine (node) to allow multiple consumers to read the action events stream in parallel. Consumers can then read from any partition regardless of where the partition is hosted.

In the embodiment depicted in FIG. 3, a consumer may be identified as a delivery subsystem 308 that delivers action events to their final destinations. In certain examples, the delivery subsystem 308 may represent an extensible service within the EMRS 112 that consists of workers (computing devices) that consume action events from the action events stream 306 and passes each action event to a corresponding destination connector in the delivery subsystem 308. Each destination connector may be configured to deliver the action events to a particular destination system. In certain examples, the destination systems may represent different systems such as a notification system 310, an object store 312 or an email client 314 where the action events may be consumed for further processing. For instance, the action events may include delivering an email message to an object store 312 for further processing, publishing the email message as a topic to a notification system 310, or transmitting the email message to an email client application (e.g., outlook) 314 for delivery to the recipient of the email message.

Figure 4:
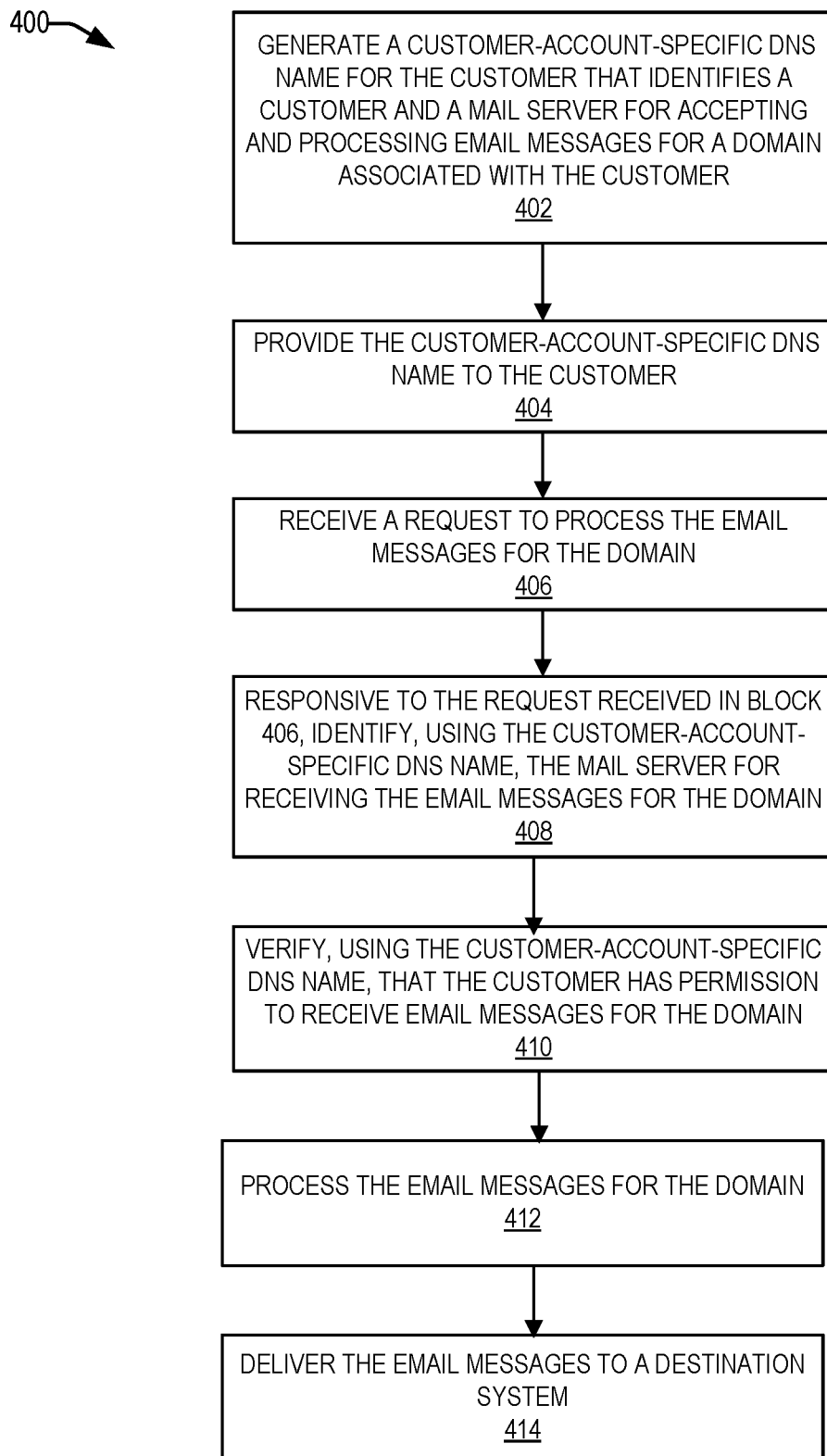
FIG. 4 depicts an example of a process 400 performed by the EMRS shown in FIG. 1 for activating the receipt of email messages for a domain associated with a customer, according to certain embodiments.

FIG. 4 depicts an example of a process 400 performed by the email message receiving system (EMRS) for activating the receipt of email messages for a domain associated with a customer, according to certain embodiments. The processing depicted in FIG. 4 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 400 presented in FIG. 4 and described below is intended to be illustrative and non-limiting. Although FIG. 4 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 4 may be performed by the email message onboarding subsystem 114 and the email message processing subsystem 120 in the EMRS.

At block 402, processing is initiated when the customer-account-specific DNS name generator subsystem 116 within the email onboarding subsystem 114 generates a customer-account-specific DNS name that identifies a customer of the EMRS 112 and a mail server for accepting and processing email messages for a domain associated with the customer. For instance, and as previously described, the customer-account-specific DNS name is a customer-account-specific A record that that uniquely identifies a customer of the EMRS 112 and identifies an IP address of the mail server responsible for accepting the email messages. The customer-account-specific A record may be generated by the customer-account-specific DNS name generator subsystem 116 responsive to receiving an onboarding request from the customer. For instance, a user (associated with a customer) may send an onboarding request (via the console UI or via API operations) using a computing device (e.g., 104) associated with the user.

At block 404, the customer-account-specific DNS name generator subsystem 116 provides the customer-account-specific DNS name to the customer by uploading it as a resource record (i.e., as a customer-account-specific A record) to a DNS provider (e.g., 126) associated with the EMRS 112. As a result of the operation performed in block 404, the EMRS DNS provider 126 publishes the customer-account-specific A record to its global DNS directory. As described in FIG. 2, a user (e.g., an administrator) of a customer of the EMRS 112 then uploads the customer-account-specific A record to a DNS portal of the customer's DNS provider 128. The customer-account-specific A record is placed inside a Mail Exchanger (MX) field of an MX record in the DNS provider 128 associated with the customer and is published in the customer's DNS provider 128. The published customer-account-specific MX record is used by the EMRS 112 to both prove that a specific account associated with the customer has authorization or permission to receive and process email messages for (or on behalf of) a domain associated with the customer and identifies a mail server in the cloud (i.e., in the EMRS 112) that is configured to receive and process email messages on behalf of the customer's email domain.

At block 406, the EMRS 112 receives a request to process email messages for a domain associated with the customer. In certain examples, the operation at block 406 may involve receiving, by the email message receipt rules subsystem 118, a set of email receipt rules from the customer to process the email messages. As previously described, a user (e.g., an administrator) of the customer may create the email receipt rules via a console UI or via API operations 105 provided by the EMRS 112. The email receipt rules specify how the EMRS 112 should handle or process the email messages that it receives for an email domain owned by the customer.

At block 408, responsive to the request received in block 406, the EMRS 112 uses the customer-account-specific MX record to identify the mail server for receiving the email messages for the domain associated with the customer. In certain examples, the EMRS 112 uses the published customer-account-specific MX record in the customer's DNS provider 128 to identify the mail sever at block 408.

At block 410, the EMRS 112 verifies, using the customer-account-specific DNS name, that the customer has permission for receiving the email messages for the domain associated with the customer. The identification performed at block 408 and the verification performed at block 410 both proves that the customer's account has permission to receive the email and also activates the receipt of email messages for the domain associated with a customer At block 412, responsive to the identification performed at block 408 and the verification performed at block 410, the email message processing subsystem 120 in the EMRS 112 processes the email messages for a domain associated with the customer. At block 414, based on the processing performed in block 412, the email message processing subsystem 120 delivers the email messages to a destination system. Additional details of the processing performed by the email message processing subsystem 120 is described in FIG. 5.

Figure 5:
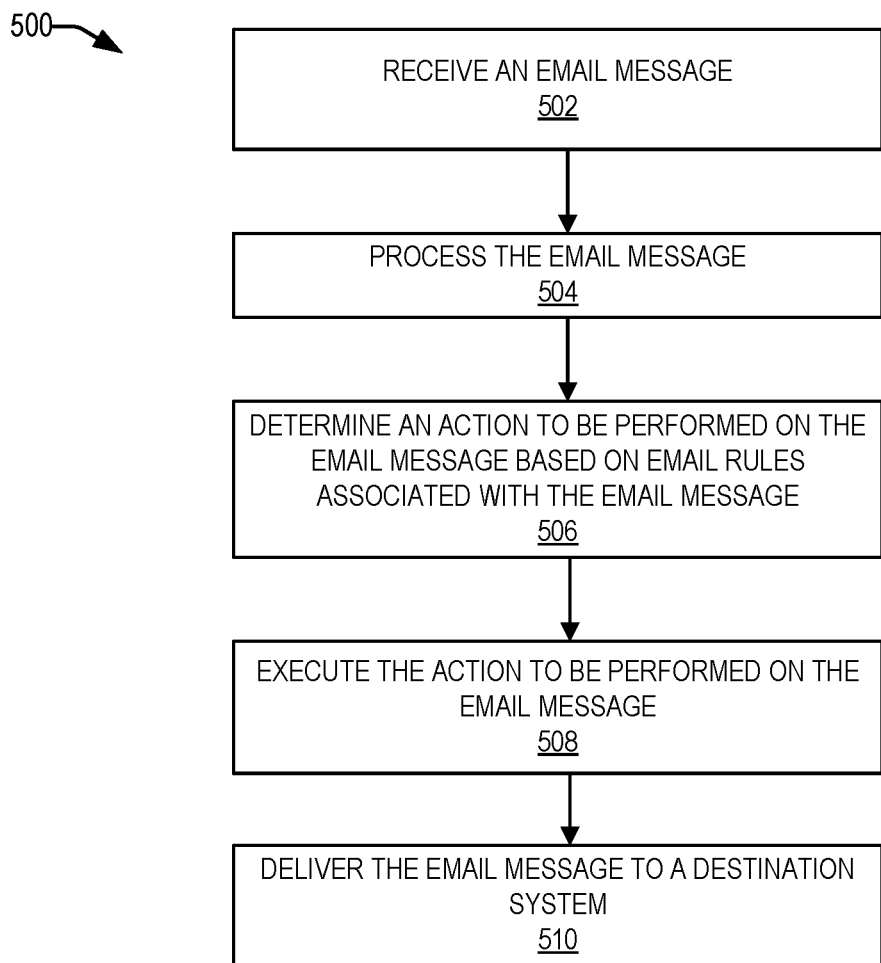
FIG. 5 depicts an example of a process 500 performed by the email message processing subsystem in the EMRS shown in FIG. 1 for receiving and processing email messages for a domain associated with a customer, according to certain embodiments.

FIG. 5 depicts an example of a process 500 performed by the email message processing subsystem in the EMRS shown in FIG. 1 for receiving and processing email messages for a domain associated with a customer, according to certain embodiments. The processing depicted in FIG. 5 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 500 presented in FIG. 5 and described below is intended to be illustrative and non-limiting. Although FIG. 5 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 5 may be performed by the subsystems of the email message processing subsystem 120.

At block 502, processing is initiated when the email message processing subsystem 120 receives an email message for a domain associated with a customer. For instance, the email message processing subsystem 120 may receive the email message via a public network (e.g., the Internet 110). As shown in the embodiment depicted in FIG. 3, an inbound email message load balancer (e.g., 302) within the email message processing subsystem 120 may be configured to receive the email message for the domain associated with the customer, identify the mail server responsible for accepting email messages for the domain and route the email messages to the identified mail server.

At block 504, the identified mail server (e.g., an MTA 304) may process the email message based on accessing the email receipt rules for the customer stored in the email receipt rules database 122. The processing, for instance, may involve determining whether to reject or accept an inbound email message for the recipient by determining if the recipient matches a recipient specified in the conditions of the email receipt rule.

At block 508, the identified mail server (e.g., the MTA 304) executes actions specified in the email receipt rule. In certain examples, the actions executed by the MTA may involve, delivering the email message to an object store for further processing, publishing the email message as a topic to a notification system, rejecting the email message by returning a bounce response to the sender or transmitting the email message to an email client application (e.g., outlook) for delivery to the recipient of the email message.

At block 510, the mail server (e.g., the MTA) delivers the email message to a destination system. In certain examples, the destination systems may represent different systems such as a notification system 310, an object store 312 or an email client application 314 where the executed actions may further be processed. For instance, the email message may be delivered to the object store 312 for further processing, published as a topic to the notification system 310, or transmitted to an email client application (e.g., outlook) 314 for delivery to the recipient of the email message. In certain examples, the processed emails may be used to provide database updates, provide service alarms, or queued to a processing system for unordered processing by a cloud application. In certain examples, the processed emails can be posted to a stream for ordered processing by a cloud application, transformed to a standard format and correlated for storage in a data warehouse. The emails can be processed as a component of a workflow system triggering a next step in a workflow or can be archived for legal compliance purposes.

The EMRS described in the present disclosure provides several technical advancements and/or improvements over existing cloud-based email receiving services by providing a new and improved onboarding process that enables customers to onboard with the EMRS in fewer steps compared to the multiple steps involved in a traditional on-boarding process. The disclosed new and improved onboarding process involves, generating by the EMRS, a customer-account-specific DNS name for a customer that uniquely identifies a customer (e.g., a cloud service account associated with the customer) of the EMRS and identifies a mail server in the EMRS that is responsible for accepting and processing email messages for a domain associated with the customer. The customer-account-specific DNS name is used to prove that the customer has authorization or permission to receive email messages for a domain owned by the customer and additionally identifies the address of the mail server responsible for receiving and processing email messages on behalf of the domain associated with the customer.

Example Architectures

The term cloud service is generally used to refer to a service that is made available by a cloud services provider (CSP) to users or customers on demand (e.g., via a subscription model) using systems and infrastructure (cloud infrastructure) provided by the CSP. Typically, the servers and systems that make up the CSP's infrastructure are separate from the customer's own on premise servers and systems. Customers can thus avail themselves of cloud services provided by the CSP without having to purchase separate hardware and software resources for the services. Cloud services are designed to provide a subscribing customer easy, scalable access to applications and computing resources without the customer having to invest in procuring the infrastructure that is used for providing the services.

There are several cloud service providers that offer various types of cloud services. There are various different types or models of cloud services including Software-as-a-Service (SaaS), Platform-as-a-Service (PaaS), Infrastructure-as-a-Service (IaaS), and others.

A customer can subscribe to one or more cloud services provided by a CSP. The customer can be any entity such as an individual, an organization, an enterprise, and the like. When a customer subscribes to or registers for a service provided by a CSP, a tenancy or an account is created for that customer. The customer can then, via this account, access the subscribed-to one or more cloud resources associated with the account.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 6:
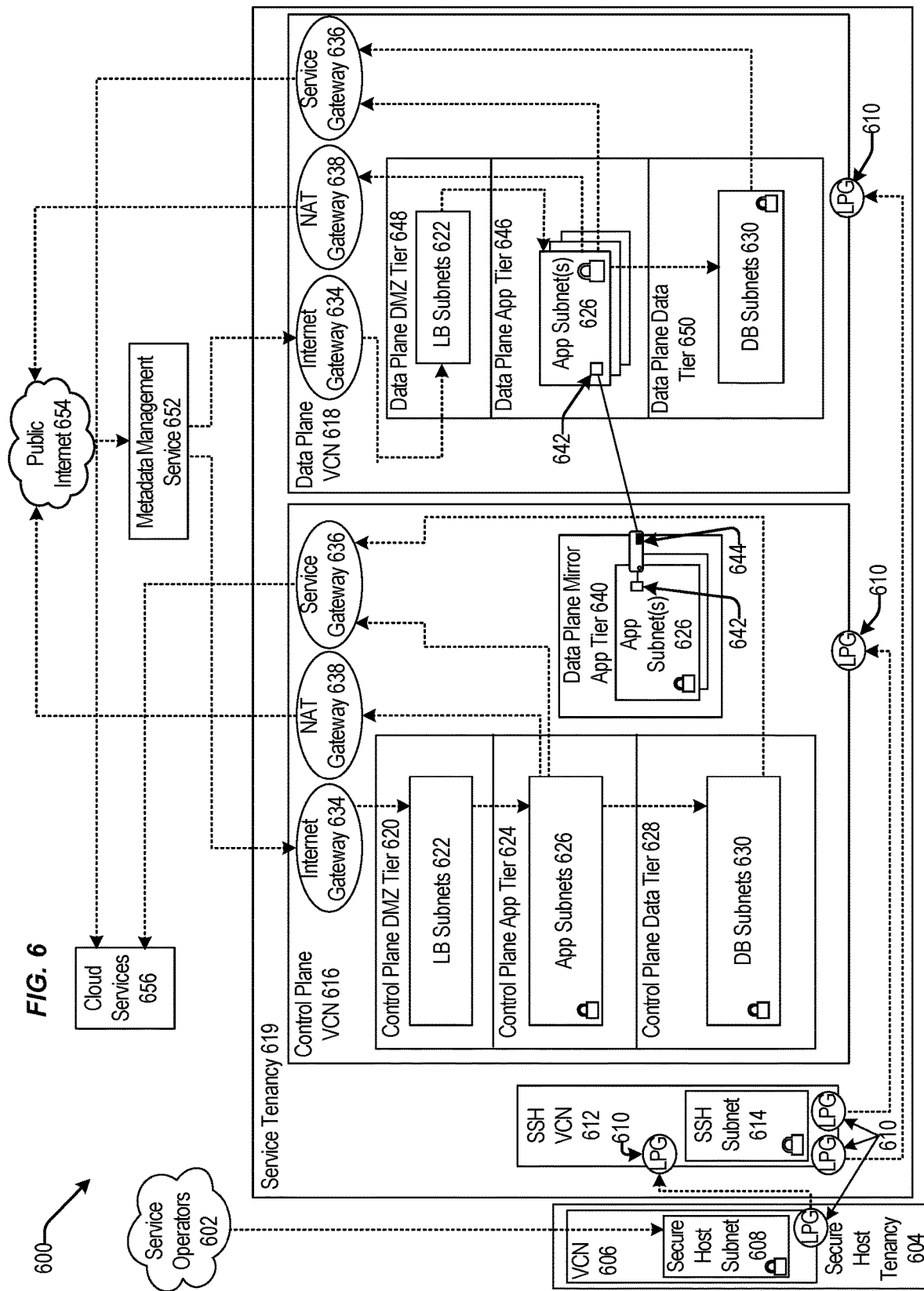
FIG. 6 is a block diagram illustrating one pattern for implementing a cloud infrastructure as a service system, according to at least one embodiment.

FIG. 6 is a block diagram 600 illustrating an example pattern of an IaaS architecture, according to at least one embodiment. Service operators 602 can be communicatively coupled to a secure host tenancy 604 that can include a virtual cloud network (VCN) 606 and a secure host subnet 608. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 606 and/or the Internet.

The VCN 606 can include a local peering gateway (LPG) 610 that can be communicatively coupled to a secure shell (SSH) VCN 612 via an LPG 610 contained in the SSH VCN 612. The SSH VCN 612 can include an SSH subnet 614, and the SSH VCN 612 can be communicatively coupled to a control plane VCN 616 via the LPG 610 contained in the control plane VCN 616. Also, the SSH VCN 612 can be communicatively coupled to a data plane VCN 618 via an LPG 610. The control plane VCN 616 and the data plane VCN 618 can be contained in a service tenancy 619 that can be owned and/or operated by the IaaS provider.

The control plane VCN 616 can include a control plane demilitarized zone (DMZ) tier 620 that acts as a perimeter network (e.g., portions of a corporate network between the corporate intranet and external networks). The DMZ-based servers may have restricted responsibilities and help keep breaches contained. Additionally, the DMZ tier 620 can include one or more load balancer (LB) subnet(s) 622, a control plane app tier 624 that can include app subnet(s) 626, a control plane data tier 628 that can include database (DB) subnet(s) 630 (e.g., frontend DB subnet(s) and/or backend DB subnet(s)). The LB subnet(s) 622 contained in the control plane DMZ tier 620 can be communicatively coupled to the app subnet(s) 626 contained in the control plane app tier 624 and an Internet gateway 634 that can be contained in the control plane VCN 616, and the app subnet(s) 626 can be communicatively coupled to the DB subnet(s) 630 contained in the control plane data tier 628 and a service gateway 636 and a network address translation (NAT) gateway 638. The control plane VCN 616 can include the service gateway 636 and the NAT gateway 638.

The control plane VCN 616 can include a data plane mirror app tier 640 that can include app subnet(s) 626. The app subnet(s) 626 contained in the data plane mirror app tier 640 can include a virtual network interface controller (VNIC) 642 that can execute a compute instance 644. The compute instance 644 can communicatively couple the app subnet(s) 626 of the data plane mirror app tier 640 to app subnet(s) 626 that can be contained in a data plane app tier 646.

The data plane VCN 618 can include the data plane app tier 646, a data plane DMZ tier 648, and a data plane data tier 650. The data plane DMZ tier 648 can include LB subnet(s) 622 that can be communicatively coupled to the app subnet(s) 626 of the data plane app tier 646 and the Internet gateway 634 of the data plane VCN 618. The app subnet(s) 626 can be communicatively coupled to the service gateway 636 of the data plane VCN 618 and the NAT gateway 638 of the data plane VCN 618. The data plane data tier 650 can also include the DB subnet(s) 630 that can be communicatively coupled to the app subnet(s) 626 of the data plane app tier 646.

The Internet gateway 634 of the control plane VCN 616 and of the data plane VCN 618 can be communicatively coupled to a metadata management service 652 that can be communicatively coupled to public Internet 654. Public Internet 654 can be communicatively coupled to the NAT gateway 638 of the control plane VCN 616 and of the data plane VCN 618. The service gateway 636 of the control plane VCN 616 and of the data plane VCN 618 can be communicatively couple to cloud services 656.

In some examples, the service gateway 636 of the control plane VCN 616 or of the data plane VCN 618 can make application programming interface (API) calls to cloud services 656 without going through public Internet 654. The API calls to cloud services 656 from the service gateway 636 can be one-way: the service gateway 636 can make API calls to cloud services 656, and cloud services 656 can send requested data to the service gateway 636. But, cloud services 656 may not initiate API calls to the service gateway 636.

In some examples, the secure host tenancy 604 can be directly connected to the service tenancy 619, which may be otherwise isolated. The secure host subnet 608 can communicate with the SSH subnet 614 through an LPG 610 that may enable two-way communication over an otherwise isolated system. Connecting the secure host subnet 608 to the SSH subnet 614 may give the secure host subnet 608 access to other entities within the service tenancy 619.

The control plane VCN 616 may allow users of the service tenancy 619 to set up or otherwise provision desired resources. Desired resources provisioned in the control plane VCN 616 may be deployed or otherwise used in the data plane VCN 618. In some examples, the control plane VCN 616 can be isolated from the data plane VCN 618, and the data plane mirror app tier 640 of the control plane VCN 616 can communicate with the data plane app tier 646 of the data plane VCN 618 via VNICs 642 that can be contained in the data plane mirror app tier 640 and the data plane app tier 646.

In some examples, users of the system, or customers, can make requests, for example create, read, update, or delete (CRUD) operations, through public Internet 654 that can communicate the requests to the metadata management service 652. The metadata management service 652 can communicate the request to the control plane VCN 616 through the Internet gateway 634. The request can be received by the LB subnet(s) 622 contained in the control plane DMZ tier 620. The LB subnet(s) 622 may determine that the request is valid, and in response to this determination, the LB subnet(s) 622 can transmit the request to app subnet(s) 626 contained in the control plane app tier 624. If the request is validated and requires a call to public Internet 654, the call to public Internet 654 may be transmitted to the NAT gateway 638 that can make the call to public Internet 654. Memory that may be desired to be stored by the request can be stored in the DB subnet(s) 630.

In some examples, the data plane mirror app tier 640 can facilitate direct communication between the control plane VCN 616 and the data plane VCN 618. For example, changes, updates, or other suitable modifications to configuration may be desired to be applied to the resources contained in the data plane VCN 618. Via a VNIC 642, the control plane VCN 616 can directly communicate with, and can thereby execute the changes, updates, or other suitable modifications to configuration to, resources contained in the data plane VCN 618.

In some embodiments, the control plane VCN 616 and the data plane VCN 618 can be contained in the service tenancy 619. In this case, the user, or the customer, of the system may not own or operate either the control plane VCN 616 or the data plane VCN 618. Instead, the IaaS provider may own or operate the control plane VCN 616 and the data plane VCN 618, both of which may be contained in the service tenancy 619. This embodiment can enable isolation of networks that may prevent users or customers from interacting with other users', or other customers', resources. Also, this embodiment may allow users or customers of the system to store databases privately without needing to rely on public Internet 654, which may not have a desired level of threat prevention, for storage.

In other embodiments, the LB subnet(s) 622 contained in the control plane VCN 616 can be configured to receive a signal from the service gateway 636. In this embodiment, the control plane VCN 616 and the data plane VCN 618 may be configured to be called by a customer of the IaaS provider without calling public Internet 654. Customers of the IaaS provider may desire this embodiment since database(s) that the customers use may be controlled by the IaaS provider and may be stored on the service tenancy 619, which may be isolated from public Internet 654.

Figure 7:
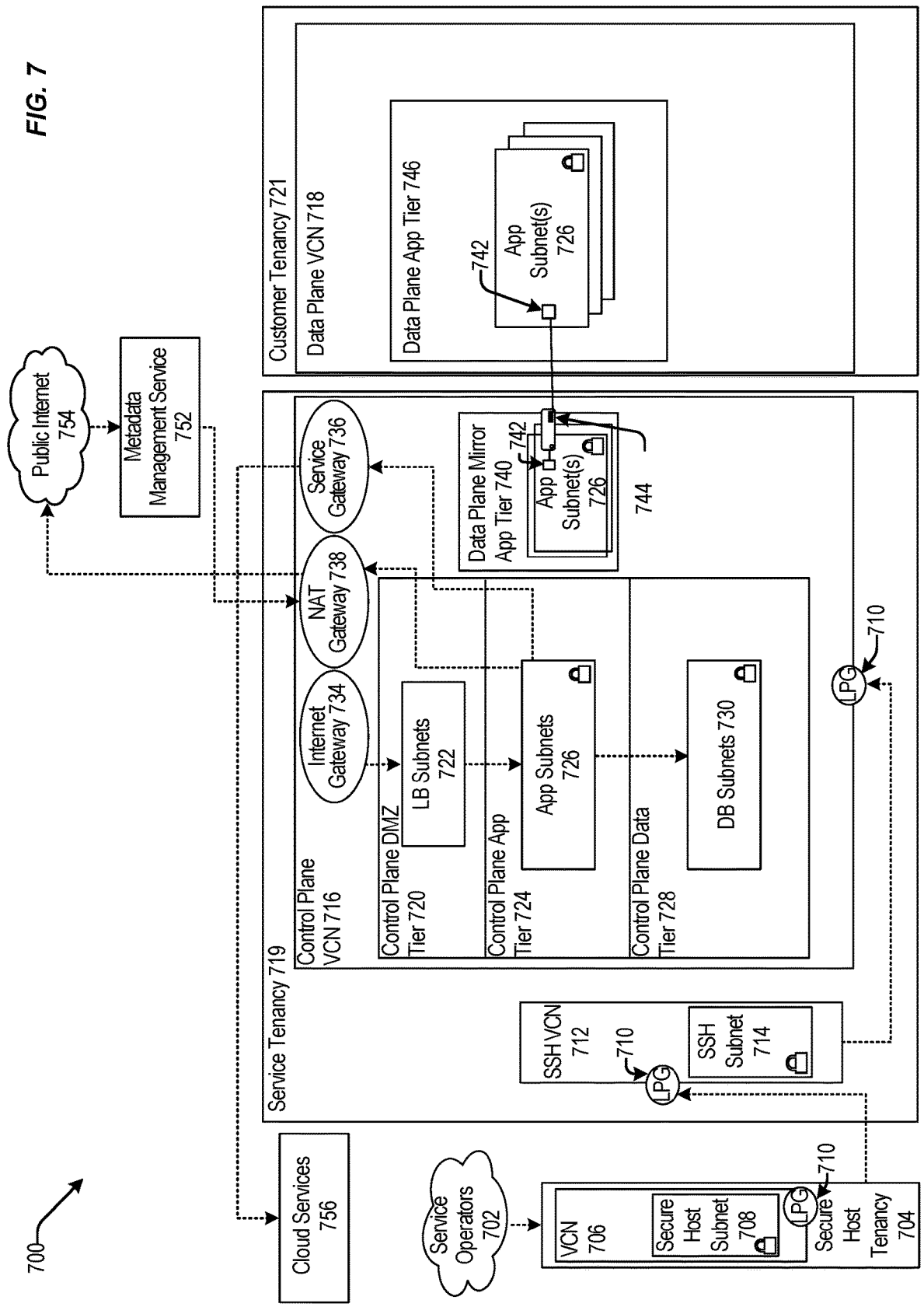
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g. service operators 602 of FIG. 6) can be communicatively coupled to a secure host tenancy 704 (e.g. the secure host tenancy 604 of FIG. 6) that can include a virtual cloud network (VCN) 706 (e.g. the VCN 606 of FIG. 6) and a secure host subnet 708 (e.g. the secure host subnet 608 of FIG. 6). The VCN 706 can include a local peering gateway (LPG) 710 (e.g. the LPG 610 of FIG. 6) that can be communicatively coupled to a secure shell (SSH) VCN 712 (e.g. the SSH VCN 612 of FIG. 6) via an LPG 610 contained in the SSH VCN 712. The SSH VCN 712 can include an SSH subnet 714 (e.g. the SSH subnet 614 of FIG. 6), and the SSH VCN 712 can be communicatively coupled to a control plane VCN 716 (e.g. the control plane VCN 616 of FIG. 6) via an LPG 710 contained in the control plane VCN 716. The control plane VCN 716 can be contained in a service tenancy 719 (e.g. the service tenancy 619 of FIG. 6), and the data plane VCN 718 (e.g. the data plane VCN 618 of FIG. 6) can be contained in a customer tenancy 721 that may be owned or operated by users, or customers, of the system.

The control plane VCN 716 can include a control plane DMZ tier 720 (e.g. the control plane DMZ tier 620 of FIG. 6) that can include LB subnet(s) 722 (e.g. LB subnet(s) 622 of FIG. 6), a control plane app tier 724 (e.g. the control plane app tier 624 of FIG. 6) that can include app subnet(s) 726 (e.g. app subnet(s) 626 of FIG. 6), a control plane data tier 728 (e.g. the control plane data tier 628 of FIG. 6) that can include database (DB) subnet(s) 730 (e.g. similar to DB subnet(s) 630 of FIG. 6). The LB subnet(s) 722 contained in the control plane DMZ tier 720 can be communicatively coupled to the app subnet(s) 726 contained in the control plane app tier 724 and an Internet gateway 734 (e.g. the Internet gateway 634 of FIG. 6) that can be contained in the control plane VCN 716, and the app subnet(s) 726 can be communicatively coupled to the DB subnet(s) 730 contained in the control plane data tier 728 and a service gateway 736 (e.g. the service gateway of FIG. 6) and a network address translation (NAT) gateway 738 (e.g. the NAT gateway 638 of FIG. 6). The control plane VCN 716 can include the service gateway 736 and the NAT gateway 738.

The control plane VCN 716 can include a data plane mirror app tier 740 (e.g. the data plane mirror app tier 640 of FIG. 6) that can include app subnet(s) 726. The app subnet(s) 726 contained in the data plane mirror app tier 740 can include a virtual network interface controller (VNIC) 742 (e.g. the VNIC of 642) that can execute a compute instance 744 (e.g. similar to the compute instance 644 of FIG. 6). The compute instance 744 can facilitate communication between the app subnet(s) 726 of the data plane mirror app tier 740 and the app subnet(s) 726 that can be contained in a data plane app tier 746 (e.g. the data plane app tier 646 of FIG. 6) via the VNIC 742 contained in the data plane mirror app tier 740 and the VNIC 742 contained in the data plane app tier 746.

The Internet gateway 734 contained in the control plane VCN 716 can be communicatively coupled to a metadata management service 752 (e.g. the metadata management service 652 of FIG. 6) that can be communicatively coupled to public Internet 754 (e.g. public Internet 654 of FIG. 6). Public Internet 754 can be communicatively coupled to the NAT gateway 738 contained in the control plane VCN 716. The service gateway 736 contained in the control plane VCN 716 can be communicatively couple to cloud services 756 (e.g. cloud services 656 of FIG. 6).

In some examples, the data plane VCN 718 can be contained in the customer tenancy 721. In this case, the IaaS provider may provide the control plane VCN 716 for each customer, and the IaaS provider may, for each customer, set up a unique compute instance 744 that is contained in the service tenancy 719. Each compute instance 744 may allow communication between the control plane VCN 716, contained in the service tenancy 719, and the data plane VCN 718 that is contained in the customer tenancy 721. The compute instance 744 may allow resources, that are provisioned in the control plane VCN 716 that is contained in the service tenancy 719, to be deployed or otherwise used in the data plane VCN 718 that is contained in the customer tenancy 721.

In other examples, the customer of the IaaS provider may have databases that live in the customer tenancy 721. In this example, the control plane VCN 716 can include the data plane mirror app tier 740 that can include app subnet(s) 726. The data plane mirror app tier 740 can reside in the data plane VCN 718, but the data plane mirror app tier 740 may not live in the data plane VCN 718. That is, the data plane mirror app tier 740 may have access to the customer tenancy 721, but the data plane mirror app tier 740 may not exist in the data plane VCN 718 or be owned or operated by the customer of the IaaS provider. The data plane mirror app tier 740 may be configured to make calls to the data plane VCN 718 but may not be configured to make calls to any entity contained in the control plane VCN 716. The customer may desire to deploy or otherwise use resources in the data plane VCN 718 that are provisioned in the control plane VCN 716, and the data plane mirror app tier 740 can facilitate the desired deployment, or other usage of resources, of the customer.

In some embodiments, the customer of the IaaS provider can apply filters to the data plane VCN 718. In this embodiment, the customer can determine what the data plane VCN 718 can access, and the customer may restrict access to public Internet 754 from the data plane VCN 718. The IaaS provider may not be able to apply filters or otherwise control access of the data plane VCN 718 to any outside networks or databases. Applying filters and controls by the customer onto the data plane VCN 718, contained in the customer tenancy 721, can help isolate the data plane VCN 718 from other customers and from public Internet 754.

In some embodiments, cloud services 756 can be called by the service gateway 736 to access services that may not exist on public Internet 754, on the control plane VCN 716, or on the data plane VCN 718. The connection between cloud services 756 and the control plane VCN 716 or the data plane VCN 718 may not be live or continuous. Cloud services 756 may exist on a different network owned or operated by the IaaS provider. Cloud services 756 may be configured to receive calls from the service gateway 736 and may be configured to not receive calls from public Internet 754. Some cloud services 756 may be isolated from other cloud services 756, and the control plane VCN 716 may be isolated from cloud services 756 that may not be in the same region as the control plane VCN 716. For example, the control plane VCN 716 may be located in "Region 1," and cloud service "Deployment 6," may be located in Region 1 and in "Region 2." If a call to Deployment 6 is made by the service gateway 736 contained in the control plane VCN 716 located in Region 1, the call may be transmitted to Deployment 6 in Region 1. In this example, the control plane VCN 716, or Deployment 6 in Region 1, may not be communicatively coupled to, or otherwise in communication with, Deployment 6 in Region 2.

Figure 8:
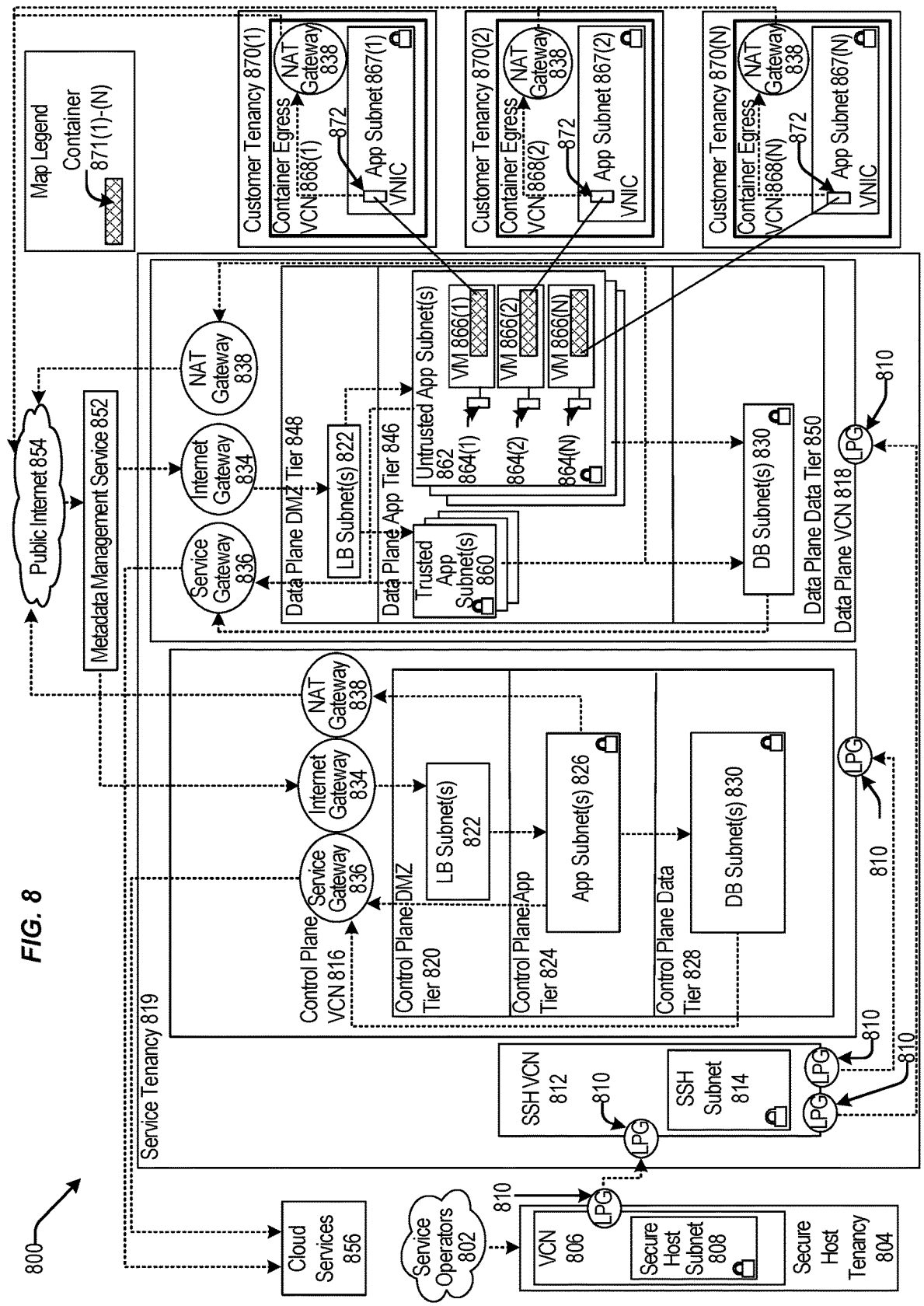
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 602 of FIG. 6) can be communicatively coupled to a secure host tenancy 804 (e.g. the secure host tenancy 604 of FIG. 6) that can include a virtual cloud network (VCN) 806 (e.g. the VCN 606 of FIG. 6) and a secure host subnet 808 (e.g. the secure host subnet 608 of FIG. 6). The VCN 806 can include an LPG 810 (e.g. the LPG 610 of FIG. 6) that can be communicatively coupled to an SSH VCN 812 (e.g. the SSH VCN 612 of FIG. 6) via an LPG 810 contained in the SSH VCN 812. The SSH VCN 812 can include an SSH subnet 814 (e.g. the SSH subnet 614 of FIG. 6), and the SSH VCN 812 can be communicatively coupled to a control plane VCN 816 (e.g. the control plane VCN 616 of FIG. 6) via an LPG 810 contained in the control plane VCN 816 and to a data plane VCN 818 (e.g. the data plane 618 of FIG. 6) via an LPG 810 contained in the data plane VCN 818. The control plane VCN 816 and the data plane VCN 818 can be contained in a service tenancy 819 (e.g. the service tenancy 619 of FIG. 6).

The control plane VCN 816 can include a control plane DMZ tier 820 (e.g. the control plane DMZ tier 620 of FIG. 6) that can include load balancer (LB) subnet(s) 822 (e.g. LB subnet(s) 622 of FIG. 6), a control plane app tier 824 (e.g. the control plane app tier 624 of FIG. 6) that can include app subnet(s) 826 (e.g. similar to app subnet(s) 626 of FIG. 6), a control plane data tier 828 (e.g. the control plane data tier 628 of FIG. 6) that can include DB subnet(s) 830. The LB subnet(s) 822 contained in the control plane DMZ tier 820 can be communicatively coupled to the app subnet(s) 826 contained in the control plane app tier 824 and to an Internet gateway 834 (e.g. the Internet gateway 634 of FIG. 6) that can be contained in the control plane VCN 816, and the app subnet(s) 826 can be communicatively coupled to the DB subnet(s) 830 contained in the control plane data tier 828 and to a service gateway 836 (e.g. the service gateway of FIG. 6) and a network address translation (NAT) gateway 838 (e.g. the NAT gateway 638 of FIG. 6). The control plane VCN 816 can include the service gateway 836 and the NAT gateway 838.

The data plane VCN 818 can include a data plane app tier 846 (e.g. the data plane app tier 646 of FIG. 6), a data plane DMZ tier 848 (e.g. the data plane DMZ tier 648 of FIG. 6), and a data plane data tier 850 (e.g. the data plane data tier 650 of FIG. 6). The data plane DMZ tier 848 can include LB subnet(s) 822 that can be communicatively coupled to trusted app subnet(s) 860 and untrusted app subnet(s) 862 of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include one or more primary VNICs 864(1)-(N) that can be communicatively coupled to tenant virtual machines (VMs) 866(1)-(N). Each tenant VM 866(1)-(N) can be communicatively coupled to a respective app subnet 867(1)-(N) that can be contained in respective container egress VCNs 868(1)-(N) that can be contained in respective customer tenancies 870(1)-(N). Respective secondary VNICs 872(1)-(N) can facilitate communication between the untrusted app subnet(s) 862 contained in the data plane VCN 818 and the app subnet contained in the container egress VCNs 868(1)-(N). Each container egress VCNs 868(1)-(N) can include a NAT gateway 838 that can be communicatively coupled to public Internet 854 (e.g. public Internet 654 of FIG. 6).

The Internet gateway 834 contained in the control plane VCN 816 and contained in the data plane VCN 818 can be communicatively coupled to a metadata management service 852 (e.g. the metadata management system 652 of FIG. 6) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some embodiments, the data plane VCN 818 can be integrated with customer tenancies 870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 846. Code to run the function may be executed in the VMs 866(1)-(N), and the code may not be configured to run anywhere else on the data plane VCN 818. Each VM 866(1)-(N) may be connected to one customer tenancy 870. Respective containers 871(1)-(N) contained in the VMs 866(1)-(N) may be configured to run the code. In this case, there can be a dual isolation (e.g., the containers 871(1)-(N) running code, where the containers 871(1)-(N) may be contained in at least the VM 866(1)-(N) that are contained in the untrusted app subnet(s) 862), which may help prevent incorrect or otherwise undesirable code from damaging the network of the IaaS provider or from damaging a network of a different customer. The containers 871(1)-(N) may be communicatively coupled to the customer tenancy 870 and may be configured to transmit or receive data from the customer tenancy 870. The containers 871(1)-(N) may not be configured to transmit or receive data from any other entity in the data plane VCN 818. Upon completion of running the code, the IaaS provider may kill or otherwise dispose of the containers 871(1)-(N).

In some embodiments, the trusted app subnet(s) 860 may run code that may be owned or operated by the IaaS provider. In this embodiment, the trusted app subnet(s) 860 may be communicatively coupled to the DB subnet(s) 830 and be configured to execute CRUD operations in the DB subnet(s) 830. The untrusted app subnet(s) 862 may be communicatively coupled to the DB subnet(s) 830, but in this embodiment, the untrusted app subnet(s) may be configured to execute read operations in the DB subnet(s) 830. The containers 871(1)-(N) that can be contained in the VM 866(1)-(N) of each customer and that may run code from the customer may not be communicatively coupled with the DB subnet(s) 830.

In other embodiments, the control plane VCN 816 and the data plane VCN 818 may not be directly communicatively coupled. In this embodiment, there may be no direct communication between the control plane VCN 816 and the data plane VCN 818. However, communication can occur indirectly through at least one method. An LPG 810 may be established by the IaaS provider that can facilitate communication between the control plane VCN 816 and the data plane VCN 818. In another example, the control plane VCN 816 or the data plane VCN 818 can make a call to cloud services 856 via the service gateway 836. For example, a call to cloud services 856 from the control plane VCN 816 can include a request for a service that can communicate with the data plane VCN 818.

Figure 9:
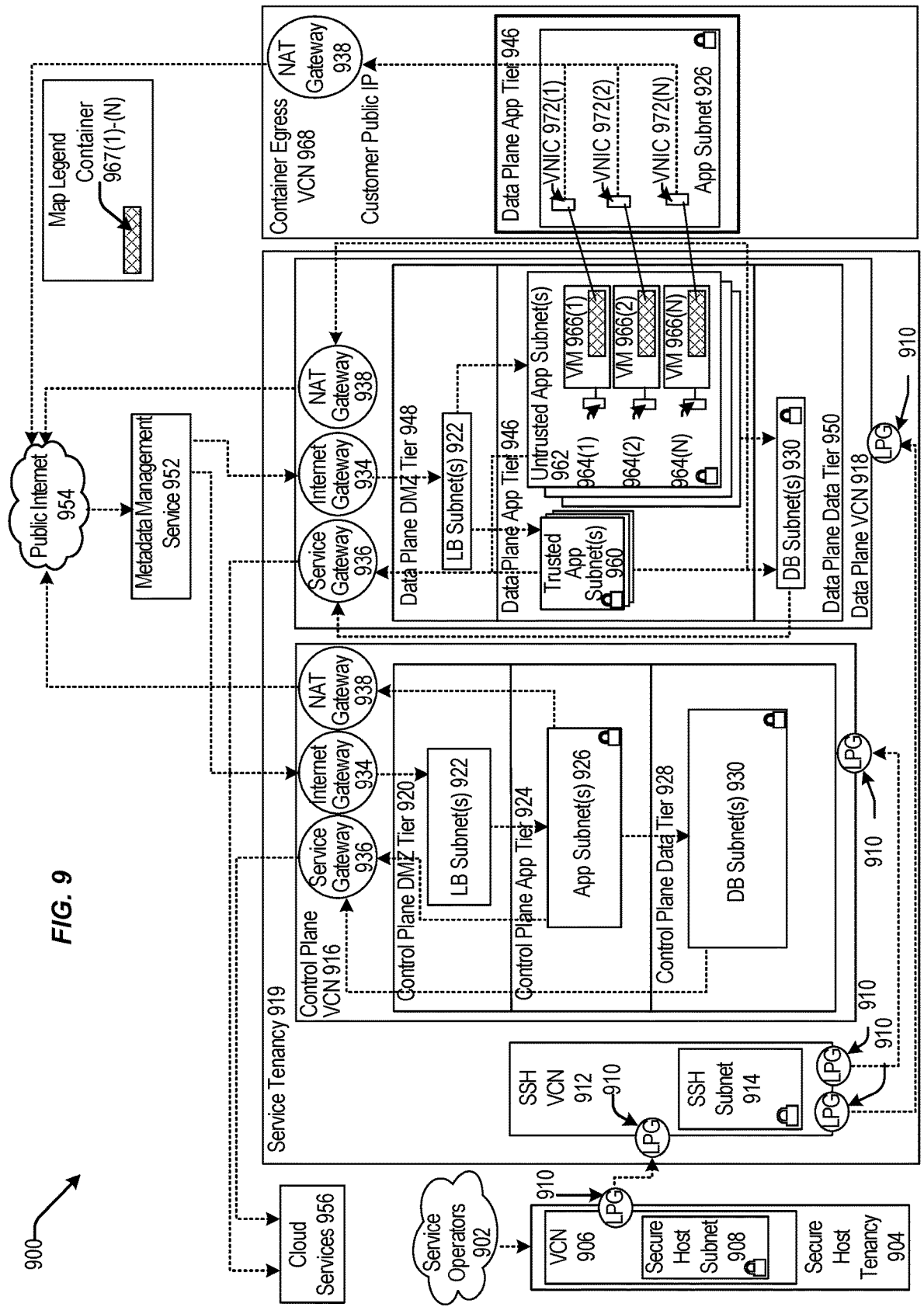
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 602 of FIG. 6) can be communicatively coupled to a secure host tenancy 904 (e.g. the secure host tenancy 604 of FIG. 6) that can include a virtual cloud network (VCN) 906 (e.g. the VCN 606 of FIG. 6) and a secure host subnet 908 (e.g. the secure host subnet 608 of FIG. 6). The VCN 906 can include an LPG 910 (e.g. the LPG 610 of FIG. 6) that can be communicatively coupled to an SSH VCN 912 (e.g. the SSH VCN 612 of FIG. 6) via an LPG 910 contained in the SSH VCN 912. The SSH VCN 912 can include an SSH subnet 914 (e.g. the SSH subnet 614 of FIG. 6), and the SSH VCN 912 can be communicatively coupled to a control plane VCN 916 (e.g. the control plane VCN 616 of FIG. 6) via an LPG 910 contained in the control plane VCN 916 and to a data plane VCN 918 (e.g. the data plane 618 of FIG. 6) via an LPG 910 contained in the data plane VCN 918. The control plane VCN 916 and the data plane VCN 918 can be contained in a service tenancy 919 (e.g. the service tenancy 619 of FIG. 6).

The control plane VCN 916 can include a control plane DMZ tier 920 (e.g. the control plane DMZ tier 620 of FIG. 6) that can include LB subnet(s) 922 (e.g. LB subnet(s) 622 of FIG. 6), a control plane app tier 924 (e.g. the control plane app tier 624 of FIG. 6) that can include app subnet(s) 926 (e.g. app subnet(s) 626 of FIG. 6), a control plane data tier 928 (e.g. the control plane data tier 628 of FIG. 6) that can include DB subnet(s) 930 (e.g. DB subnet(s) 830 of FIG. 8). The LB subnet(s) 922 contained in the control plane DMZ tier 920 can be communicatively coupled to the app subnet(s) 926 contained in the control plane app tier 924 and to an Internet gateway 934 (e.g. the Internet gateway 634 of FIG. 6) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 6) and a network address translation (NAT) gateway 938 (e.g. the NAT gateway 638 of FIG. 6). The control plane VCN 916 can include the service gateway 936 and the NAT gateway 938.

The data plane VCN 918 can include a data plane app tier 946 (e.g. the data plane app tier 646 of FIG. 6), a data plane DMZ tier 948 (e.g. the data plane DMZ tier 648 of FIG. 6), and a data plane data tier 950 (e.g. the data plane data tier 650 of FIG. 6). The data plane DMZ tier 948 can include LB subnet(s) 922 that can be communicatively coupled to trusted app subnet(s) 960 (e.g. trusted app subnet(s) 860 of FIG. 8) and untrusted app subnet(s) 962 (e.g. untrusted app subnet(s) 862 of FIG. 8) of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include primary VNICs 964(1)-(N) that can be communicatively coupled to tenant virtual machines (VMs) 966(1)-(N) residing within the untrusted app subnet(s) 962. Each tenant VM 966(1)-(N) can run code in a respective container 967(1)-(N), and be communicatively coupled to an app subnet 926 that can be contained in a data plane app tier 946 that can be contained in a container egress VCN 968. Respective secondary VNICs 972(1)-(N) can facilitate communication between the untrusted app subnet(s) 962 contained in the data plane VCN 918 and the app subnet contained in the container egress VCN 968. The container egress VCN can include a NAT gateway 938 that can be communicatively coupled to public Internet 954 (e.g. public Internet 654 of FIG. 6).

The Internet gateway 934 contained in the control plane VCN 916 and contained in the data plane VCN 918 can be communicatively coupled to a metadata management service 952 (e.g. the metadata management system 652 of FIG. 6) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some examples, the pattern illustrated by the architecture of block diagram 900 of FIG. 9 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 967(1)-(N) that are contained in the VMs 966(1)-(N) for each customer can be accessed in real-time by the customer. The containers 967(1)-(N) may be configured to make calls to respective secondary VNICs 972(1)-(N) contained in app subnet(s) 926 of the data plane app tier 946 that can be contained in the container egress VCN 968. The secondary VNICs 972(1)-(N) can transmit the calls to the NAT gateway 938 that may transmit the calls to public Internet 954. In this example, the containers 967(1)-(N) that can be accessed in real-time by the customer can be isolated from the control plane VCN 916 and can be isolated from other entities contained in the data plane VCN 918. The containers 967(1)-(N) may also be isolated from resources from other customers.

In other examples, the customer can use the containers 967(1)-(N) to call cloud services 956. In this example, the customer may run code in the containers 967(1)-(N) that requests a service from cloud services 956. The containers 967(1)-(N) can transmit this request to the secondary VNICs 972(1)-(N) that can transmit the request to the NAT gateway that can transmit the request to public Internet 954. Public Internet 954 can transmit the request to LB subnet(s) 922 contained in the control plane VCN 916 via the Internet gateway 934. In response to determining the request is valid, the LB subnet(s) can transmit the request to app subnet(s) 926 that can transmit the request to cloud services 956 via the service gateway 936.

It should be appreciated that IaaS architectures 600, 700, 800, 900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 10:
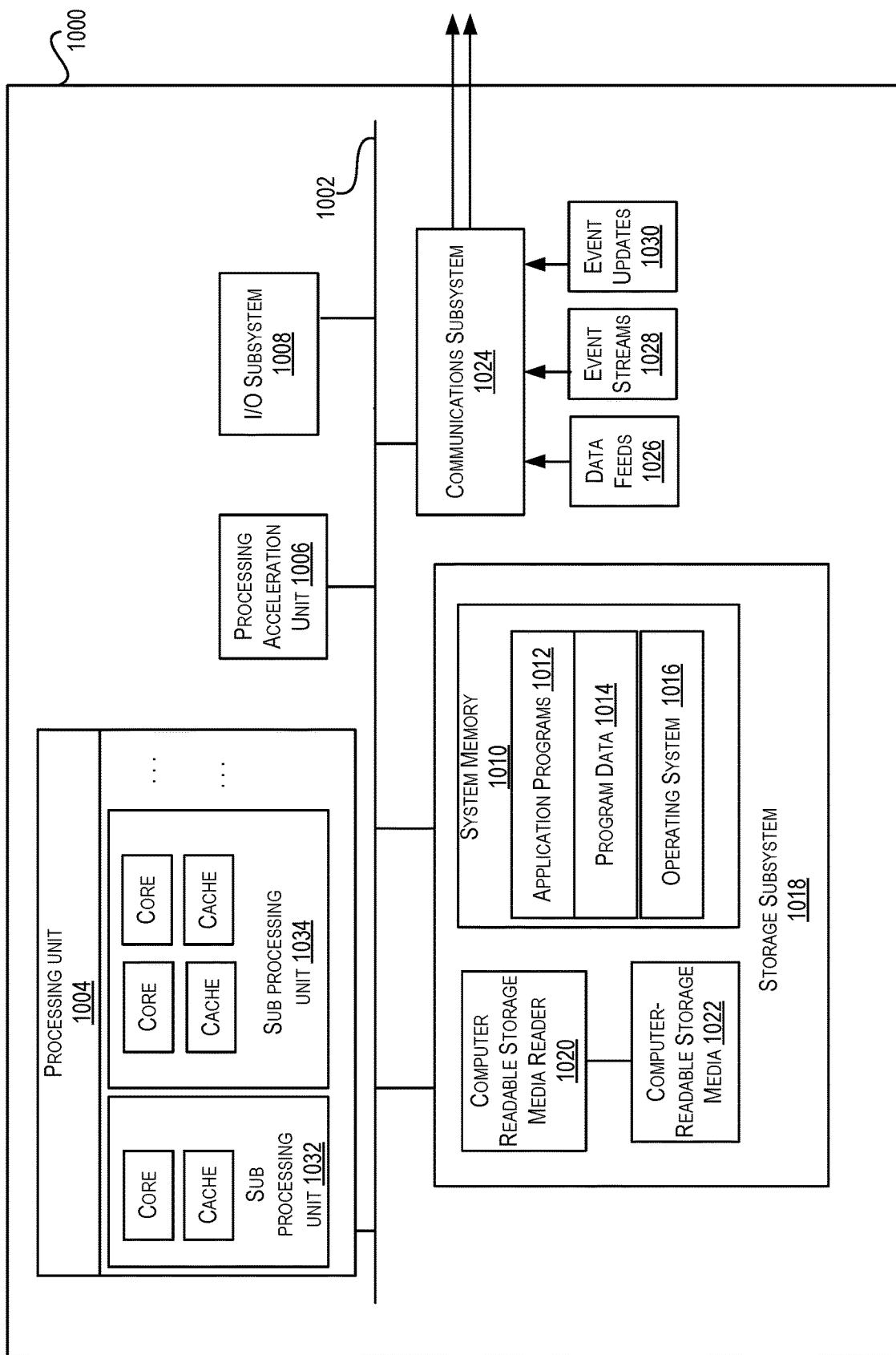
FIG. 10 is a block diagram illustrating an example computer system, according to at least one embodiment.

FIG. 10 illustrates an example computer system 1000, in which various embodiments may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present disclosure.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
   generating, by an email message receiving system, a customer-account-specific Domain Name Server (DNS) name, the customer-account-specific DNS name identifying a customer of the email message receiving system and a mail server for accepting and processing a plurality of email messages for a domain associated with the customer;
   providing, by the email message receiving system, the customer-account-specific DNS name to the customer;
   receiving, by the email message receiving system, a request to process the plurality of email messages for the domain associated with the customer;
   responsive to the request, identifying, by the email message receiving system, using the customer-account-specific DNS name, the mail server for receiving the plurality of email messages for the domain associated with the customer;
   verifying, by the email message receiving system, using the customer-account-specific DNS name, that the customer has permission for receiving the plurality of email messages for the domain associated with the customer;
   responsive to the identifying and the verifying, processing, by the email message receiving system, the plurality of email messages for the domain; and
   based at least in part on the processing, delivering, by the email message receiving system, the plurality of email messages to a destination system.

2. The method of claim 1, wherein the customer-account-specific DNS name is a customer-account-specific address (A) record that identifies an Internet Protocol (IP) address of the mail server for accepting the plurality of email messages for the domain associated with the customer.

3. The method of claim 2, wherein the customer-account-specific A record comprises a region identifier identifying a location of the mail server for receiving the plurality of email messages for the domain associated with the customer.

4. The method of claim 2, wherein the customer-account-specific A record comprises a customer-specific identifier that uniquely identifies the customer of the email message receiving service.

5. The method of claim 4, wherein the customer-specific identifier represents a unique random number or a hash-based message authentication code of an email domain cloud resource identifier associated with the customer.

6. The method of claim 1, wherein providing the customer-account-specific DNS name to the customer comprises publishing, by the email message receiving system, the customer-account-specific DNS name to a DNS associated with the email message receiving system.

7. The method of claim 1, wherein receiving the request to process the plurality of email messages for the domain associated with the customer comprises receiving, by the email message receiving system, a set of one or more email message receipt rules for processing the plurality of email messages for the domain.

8. The method of claim 7, wherein the set of one or more email receipt rules comprise at least a condition and a set of one or more actions to be performed by the mail server for processing in the plurality of email messages.

9. The method of claim 1, wherein processing, by the email message receiving system, the plurality of email messages for the domain associated with the customer further comprises:
determining, for each email message in the plurality of email messages, a recipient of the email message;
determining that the recipient matches a target recipient specified in a condition for an email receipt rule in a set of email receipt rules; and
based at least in part on the determining, executing, a corresponding action specified in the email receipt rule.

10. The method of claim 9, wherein the action comprises delivering the email message to an email client application associated with the recipient for delivery to the recipient.

11. The method of claim 9, wherein the action comprises rejecting the email message by returning a bounce message to the sender of the recipient.

12. The method of claim 9, wherein the action comprises delivering the email message to an object data store in the email message receiving system for further processing of the email message.

13. The method of claim 9, wherein the action comprises publishing the email message as a topic to a notification system in the email message receiving system.

14. An email message receiving system comprising:
a memory; and
one or more processors configured to perform processing, the processing comprising:
generating a customer-account-specific Domain Name Server (DNS) name, the customer-account-specific DNS name identifying a customer of the email message receiving system and a mail server for accepting and processing a plurality of email messages for a domain associated with the customer;
providing the customer-account-specific DNS name to the customer;
receiving a request to process the plurality of email messages for the domain associated with the customer;
responsive to the request, identifying, using the customer-account-specific DNS name, the mail server for receiving the plurality of email messages for the domain associated with the customer;
verifying, using the customer-account-specific DNS name, that the customer has permission for receiving the plurality of email messages for the domain associated with the customer;
responsive to the identifying and the verifying, processing the plurality of email messages for the domain; and
based at least in part on the processing, delivering the plurality of email messages to a destination system.

15. The system of claim 14, wherein the customer-account-specific DNS name is a customer-account-specific address (A) record that identifies an Internet Protocol (IP) address of the mail server for accepting the plurality of email messages for the domain associated with the customer.

16. The system of claim 15, wherein the customer-account-specific A record comprises a region identifier identifying a location of the mail server for receiving the plurality of email messages for the domain associated with the customer.

17. The system of claim 14, wherein providing the customer-account-specific DNS name to the customer comprises publishing the customer-account-specific DNS name to a DNS associated with the email message receiving system.

18. A non-transitory computer-readable medium having program code that is stored thereon, the program code executable by one or more processing devices for performing operations comprising:
generating a customer-account-specific Domain Name Server (DNS) name, the customer-account-specific DNS name identifying a customer of the email message receiving system and a mail server for accepting and processing a plurality of email messages for a domain associated with the customer;
providing the customer-account-specific DNS name to the customer;
receiving a request to process the plurality of email messages for the domain associated with the customer;
responsive to the request, identifying, using the customer-account-specific DNS name, the mail server for receiving the plurality of email messages for the domain associated with the customer;
verifying, using the customer-account-specific DNS name, that the customer has permission for receiving the plurality of email messages for the domain associated with the customer;
responsive to the identifying and the verifying, processing the plurality of email messages for the domain; and
based at least in part on the processing, delivering the plurality of email messages to a destination system.

19. The non-transitory computer-readable medium of claim 18, wherein the customer-account-specific DNS name is a customer-account-specific address (A) record that identifies an Internet Protocol (IP) address of the mail server for accepting the plurality of email messages for the domain associated with the customer.

20. The non-transitory computer-readable medium of claim 19, wherein the customer-account-specific A record comprises a region identifier identifying a location of the mail server for receiving the plurality of email messages for the domain associated with the customer and a customer-specific identifier that uniquely identifies the customer of the email message receiving service.

* * * * *